United States Patent [19]
Kikinis et al.

[11] Patent Number: 5,628,031
[45] Date of Patent: May 6, 1997

[54] PERSONAL DIGITAL ASSISTANT MODULE IMPLEMENTED AS A LOW-PROFILE PRINTED CIRCUIT ASSEMBLY HAVING A RIGID SUBSTRATE WHEREIN IC DEVICES ARE MOUNTED WITHIN OPENINGS WHOLLY BETWEEN OPPOSITE PLANE SURFACES OF THE RIGID SUBSTRATE

[75] Inventors: Dan Kikinis, Saratoga; Pascal Dornier, Sunnyvale; William J. Seiler, Scotts Valley, all of Calif.

[73] Assignee: Elonex IP Holdings Ltd., London, England

[21] Appl. No.: 335,325

[22] Filed: Nov. 7, 1994

Related U.S. Application Data

[63] Continuation-in-part of Ser. No. 144,231, Oct. 28, 1993, and Ser. No. 93,774, Jul. 19, 1993, Pat. No. 5,412,538.

[51] Int. Cl.$^6$ .................. G06F 13/00; G06F 19/00; H04M 11/00; H05K 1/14
[52] U.S. Cl. .................. 395/893; 361/749; 345/173; 455/89; 379/96
[58] Field of Search .................. 395/325, 800, 395/275, 425, 725, 155, 893, 200.01; 345/160, 169, 173; 379/93, 96; 364/709.08; 361/683, 686, 749, 792; 455/89; 437/209, 219; 439/55

[56] References Cited

U.S. PATENT DOCUMENTS

| | | | |
|---|---|---|---|
| 4,523,297 | 6/1985 | Ugon et al. | 364/709.1 |
| 4,534,012 | 8/1985 | Yokozawa | 395/275 |
| 4,545,023 | 10/1985 | Mizzi | 364/709.13 |
| 4,679,085 | 7/1987 | Johnson et al. | 348/716 |
| 4,748,656 | 5/1988 | Gibbs et al. | 379/93 |
| 4,766,095 | 8/1988 | Hiroshi | 437/217 |
| 4,849,674 | 7/1989 | Cherry et al. | 313/509 |
| 4,916,441 | 4/1990 | Gombrich | 340/712 |
| 5,133,076 | 7/1992 | Hawkins | 395/800 |
| 5,283,862 | 2/1994 | Lund | 395/155 |
| 5,363,275 | 11/1994 | Frankeny et al. | 361/749 |
| 5,396,102 | 3/1995 | Toshio et al. | 257/723 |
| 5,437,095 | 8/1995 | Nguyen et al. | 29/827 |
| 5,448,450 | 9/1995 | Burns | 361/713 |
| 5,476,629 | 12/1995 | Yabe et al. | 264/328.7 |
| 5,496,775 | 3/1996 | Brooks | 437/219 |

OTHER PUBLICATIONS

Advancing The Module Art General Electric: New multichip module technology alloys bare chips to be placed closely Electronic Buyers' News, Nov. 26, 1990, p. 2.
Hybrid technology ups interconnect densities Electronic, Aug. 12, 1985, pp. 17, 18.

*Primary Examiner*—Gopal C. Ray
*Attorney, Agent, or Firm*—Donald R. Boys

[57] ABSTRACT

A personal digital assistant module with a local CPU, memory, and I/O interface has a host interface comprising a bus connected to the local CPU and a connector at a surface of the personal digital assistant for interfacing to a bus connector of a host general-purpose computer, providing direct bus communication between the personal digital assistant and the host general-purpose computer. In an embodiment, the personal digital assistant also stores a security code. The personal digital assistant according to the invention forms a host/satellite combination with a host computer having a docking bay, wherein upon docking a docking protocol controls access by the host to memory of the personal digital assistant based on one or more passwords provided by a user to the host. In another embodiment the personal digital assistant also has an expansion port connected to the local CPU, and expansion peripheral devices may be connected and operated through the expansion port. In yet another embodiment a low-profile construction technique is used wherein discrete elements are assembled wholly enclosed within openings in a rigid substrate having interconnects on a surface of the substrate.

20 Claims, 23 Drawing Sheets

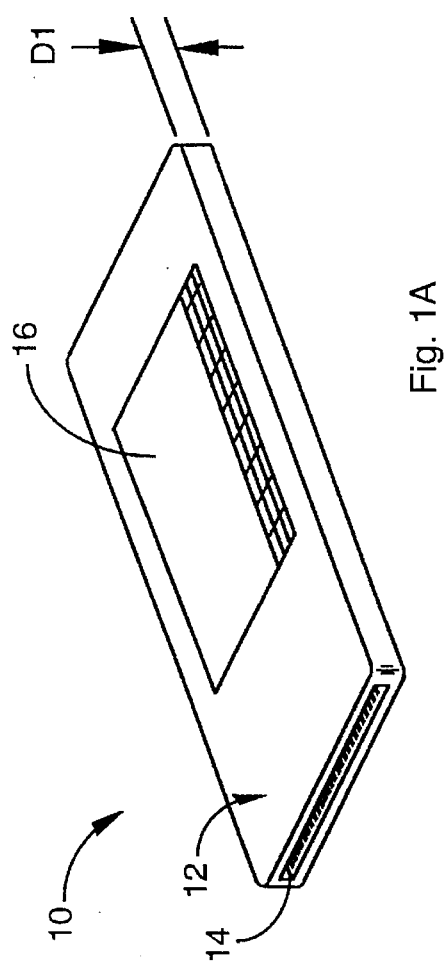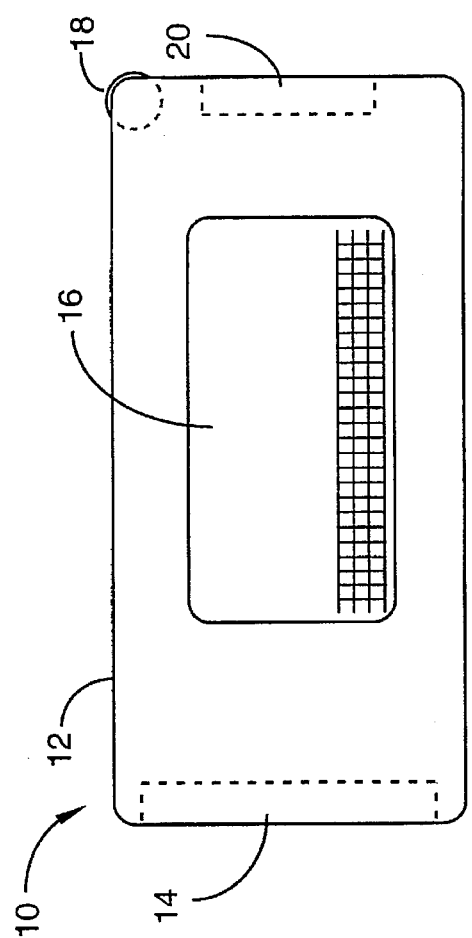
Fig. 1A
Fig. 1B

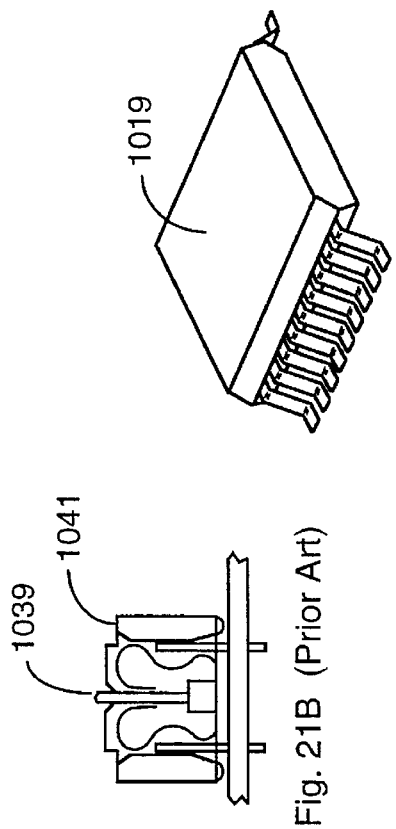
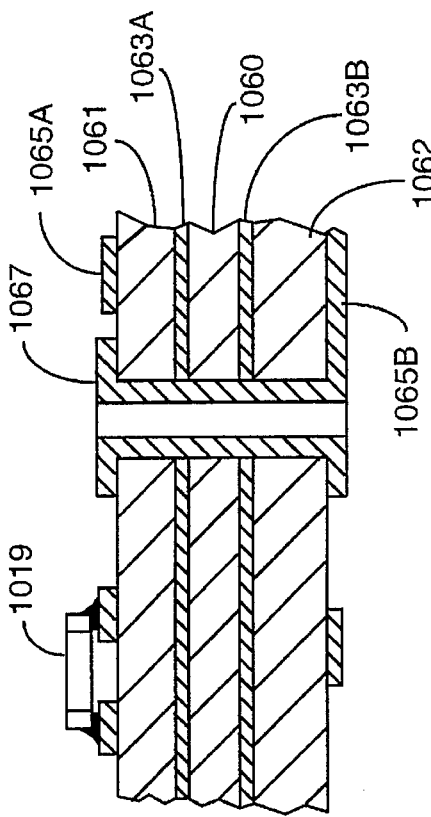
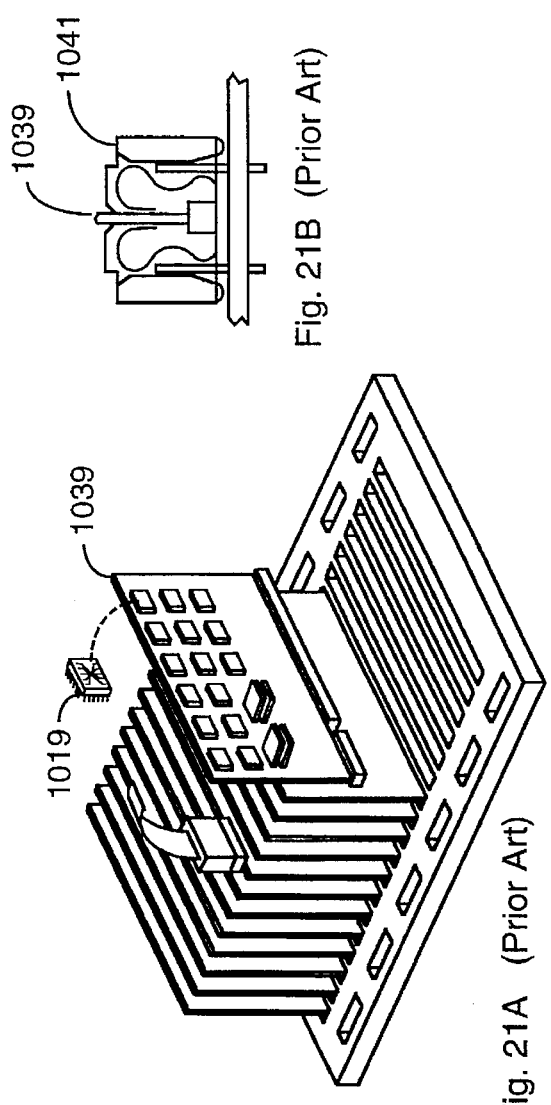
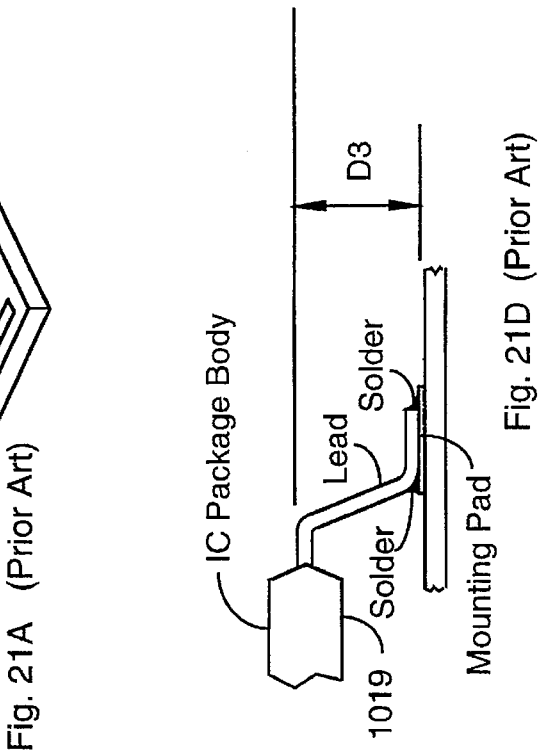

PERSONAL DIGITAL ASSISTANT MODULE IMPLEMENTED AS A LOW-PROFILE PRINTED CIRCUIT ASSEMBLY HAVING A RIGID SUBSTRATE WHEREIN IC DEVICES ARE MOUNTED WITHIN OPENINGS WHOLLY BETWEEN OPPOSITE PLANE SURFACES OF THE RIGID SUBSTRATE

CROSS REFERENCE TO RELATED DOCUMENTS

This application is a continuation-in-part of application Ser. No. 08/144,231 filed Oct. 28, 1993, and of application Ser. No. 08/093,774, filed Jul. 9, 1993, now U.S. Pat. No. 5,412,538.

FIELD OF THE INVENTION

This invention is in the area of portable computers and pertains more specifically to small portable computing devices known in the art as personal digital assistants, and to manufacturing techniques for producing such devices.

BACKGROUND OF THE INVENTION

Personal Digital Assistant (PDA) units, as of the date of this disclosure, enjoy a position of hope in the computer marketplace. Some believe this approach, a small, relatively inexpensive, and eminently portable computer unit, having software specifically written for tasks a user might expect to perform while travelling, will provide eminently useful and therefore salable computer products. Apple Computer, Hewlett Packard, and several other well-known computer manufacturers have made a considerable investment at no small risk in such systems.

Given the new systems now introduced, and those coming, for what is now known about them, there are still a number of drawbacks and problems. For example:

1. The PDA systems introduced are relatively costly, with starting prices ranging from several hundred dollars to two thousand dollars and more. At such prices, rivalling current pricing for desktop systems, the buying public may react negatively. It is true that prices will fall with increased manufacturing volume and competition, but the high end start may well be rejected by potential users.

2. The systems being offered are still relatively bulky, considering the limited range of tasks that may be accomplished. Most are certainly too big to be conveniently carried in a breast pocket. The Newton, manufactured by Apple Corporation, weighs about a pound and is approximately the size of a VHS video cassette.

3. A big drawback of the PDA systems being offered is the way they transfer data between a user's desktop unit, or other host, and the PDA. Known communication is by modem, by infrared communication, and by serial connection. These all require manipulation by a user, modulation on one or both ends of the communication path, and the like, which can be time-consuming, error-prone, and hardware extensive (expensive). Presently the Newton offers a modem and/or LED communication as an option, adding to the overall cost.

4. In known PDAs, software is typically recorded in ROM, so updating applications can be difficult, and sometimes impossible. This will be a problem because PDA users will not want the PDA to have the same capabilities at all times. Typical users will be people who travel and work while they travel. These users require different functions for a trip to Taiwan than for a trip to France, for example. What is needed is a quick and convenient means to update and substitute software.

5. Another difficulty is in the fact that the data files a user manipulates while travelling are typically data files also resident in a home unit, herein called a host unit, such as the user's office desktop machine or notebook or other portable computer. It is very troublesome to have two or more sets of critical data, with differences that one must remember to correct at an appropriate time. This can cause unending grief if files are not correctly updated. At best, current PDAs must use a relatively slow compressed bus to download and upgrade files. Typically this is done through a serial port, using a linking application like Laplink™.

What is needed is a small and inexpensive PDA that has a range of features that eliminate the above-described risks and problems. This new unit needs to be smaller than those presently being introduced, such as about credit-card size, or perhaps modeled on the PCMCIA type II or type III standard form factors. It should be inexpensive enough to produce that at least a minimum version could be sold in the roughly $100–$200 range, so it will be a unit seen to be a relatively inexpensive necessity. A PDA unit of this sort is the subject of the present invention, and is termed by the inventors a micro-PDA, or μPDA.

A very important feature of the μPDA in an aspect of the present invention is a direct parallel bus interface with a connector allowing the unit to be docked by plugging it into a docking bay in a host unit. Moreover, when the μPDA is docked in the host, there needs to be a means to effectively disable the CPU in the μPDA and to provide direct access to both the μPDA software and data storage by the host CPU. This direct access would provide immediate ability to communicate in the fastest available fashion between the μPDA and the host, and would also facilitate additional important features to be described below.

The μPDA also needs to have an optional compressed bus interface, including a connector separate from the host interface, so add-on devices may be utilized, such as a FAX modem, cellular communication, printer, and so on.

An additional feature that could be optionally provided in another aspect of the invention is an interface at the host to allow a user to select pre-arranged software mixes for loading to the μPDA. This feature comprises a set of control routines operating in conjunction with the host's display and input means, to allow the user to quickly select applications and perhaps data as well to be loaded to the μPDA satellite, to configure the smaller, more portable unit for specific itineraries and purposes.

Another desirable feature is an ability to automatically update data files. In this aspect of the invention, with the μPDA docked, data on the host, if carrying a later date and/or time stamp than the data on the μPDA, would be automatically updated on the μPDA and vice-versa. When one returns from an excursion using the μPDA and docks the satellite at the host, the host gains access, determines the location of the latest files, and accomplishes the update. This feature needs to have some built-in user prompting to be most effective. It makes the μPDA a true satellite system.

SUMMARY OF THE INVENTION

In a preferred embodiment of the invention a personal digital assistant module is provided comprising an enclosure for enclosing and supporting internal elements, a microcontroller within the enclosure for performing digital operations to manage functions of the personal digital assistant module, and a memory connected to the microcontroller by a bus structure for storing data and executable routines. There is a power supply within the enclosure for supplying power to functional elements of the personal digital assistant module, and a touchscreen combination display/input apparatus implemented on a surface of the enclosure. A host interface means comprising a host interface bus structure, which may be configured as a PCMCIA bus interface, is connected to the microcontroller and to a first portion of a host interface connector at a surface of the enclosure, and the host interface means is configured to directly connect the microcontroller to a compatible bus structure of a host computer.

In a preferred embodiment the elements of the personal digital assistant module are assembled with IC elements, such as the microcontroller and the memory device, enclosed within openings in a rigid substrate, with bus traces and other interconnects inplemented on a surface of the substrate.

In one embodiment the personal digital assistant module has an expansion bus interface comprising an expansion bus structure connected to the microcontroller and to a first portion of an expansion bus connector for connecting the microcontroller to a peripheral device. A wide variety of peripheral devices are provided for use with the personal digital assistant of the invention.

In another aspect, the personal digital assistant module also has a nonvolatile storage device, such as an EEPROM connected to the microcontroller and containing one or more codes unique to the personal digital assistant, for uniquely identifying the personal digital assistant to digital devices connected on the host interface.

In a preferred embodiment, the display and input means for the personal digital assistant are configured as an overlaid touch screen and LCD display on a surface of the outer case of the personal digital assistant. A pointer device implemented as a thumbwheel in one embodiment and as a pressure sensitive pad in another is provided as part of the input capability.

The personal digital assistant module forms a unique combination with a general-purpose computer host having the personal digital assistant as a satellite unit. The host in this instance has a docking bay especially configured to dock the personal digital assistant, making a direct bus connection between the local CPU of the personal digital assistant and the CPU of the host. The host may be a desktop unit, a notebook computer, or a smaller portable like a palmtop computer. This combination provides power and convenience not before available.

Many other digital devices are also provided according to various aspects of the invention, such as modems, scanners, data acquisition peripherals, cellular phones, and a software vending machine, and all of these devices may be appended to the personal digital assistant by the expansion bus interface or, in many cases, by the host interface.

The personal digital assistant provided according to embodiments of the present invention is a unit more compact than conventional PDAs. It represents a new dimension in computer application and applicability, in a form promising to be eminently usable by and useful to almost everyone; and at a price easily affordable. It solves the communication problem intrinsic to personal digital assistants relative to larger and more powerful computers, with a unit that fits into a user's breast pocket, and at a very low price.

BRIEF DESCRIPTION OF THE DRAWINGS

FIG. 1A is an isometric view of a μPDA according to an embodiment of the present invention.

FIG. 1B is a plan view of the μPDA of FIG. 1A.

FIG. 21A shows a motherboard and PCB modules in a conventional configuration.

FIG. 21B shows a conventional connection technology.

FIG. 21C is an illustration of a DRAM module as known in the art.

FIG. 21D is a partial sectional view of a typical IC soldered to a board, showing a lead configuration.

FIG. 22 is an idealized cross-sectional view of a conventional multilayer printed circuit board.

DESCRIPTION OF THE PREFERRED EMBODIMENTS

FIG. 1A is an isometric view of a µPDA 10 according to an embodiment of the present invention. In this embodiment the unit is modeled on the PCMCIA standard Type II form factor, having a height D1 of about 5 mm. Body 12 is described in further detail below, and has a female portion 14 of a connector recessed at one end for engaging a mating male portion of the connector in a host computer, connecting the µPDA internal circuitry directly with a host internal bus. The host unit may be a notebook computer having a docking bay for the µPDA. Docking bays may be provided in desktop and other types of computers, and even in other kinds of digital equipment, several examples of which are described below.

Still referring to FIG. 1A, in this embodiment there is a combination I/O interface 16 implemented on one side of the µPDA, comprising a display overlaid with a touch-sensitive planar structure providing softkey operation in conjunction with interactive control routines operable on the µPDA in a stand-alone mode.

Although not shown in FIG. 1A, there may also be guides implemented along the sides of the case of the device for guiding the module in and out of a docking bay in a host computer unit. There may also be one or more mechanical features facilitating engagement and disengagement of the module in a docking bay.

FIG. 1B is a top plan view of the µPDA of FIG. 1A, showing a thumbwheel 18 implemented in one corner of the µPDA. The thumbwheel in this embodiment is an input device capable of providing input with both amplitude and directional characteristics, and in some cases rate characteristics as well. The thumbwheel has many uses in combination with the µPDA and I/O interface 16. One such use is controlled scrolling of icons, characters, menus, and the like on the display of the device. The thumbwheel provides many of the functions of a pointer device.

In this embodiment of the µPDA a second external connector portion 20 is provided. This connector portion is for engaging peripheral devices as part of an expansion bus interface.

Figure 2:
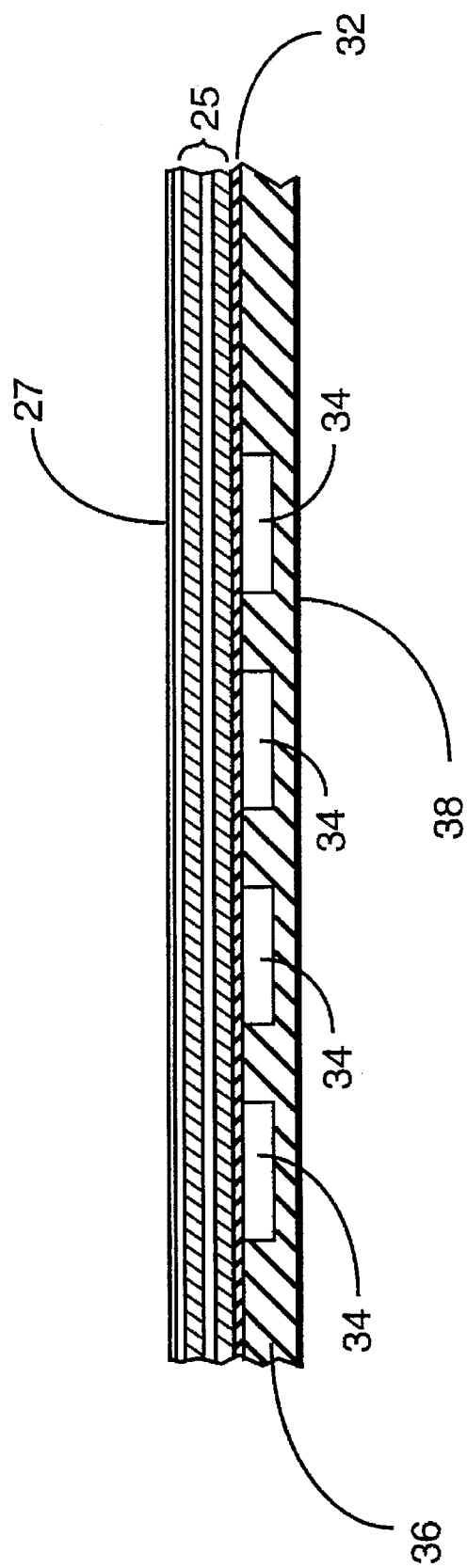
FIG. 2 is a cross-sectional view of the μPDA of FIGS. 1A and 1B.

FIG. 2 is a simplified cross-sectional view of a means for constructing a µPDA according to the present invention in a Type II PCMCIA, or other relatively small package. ICs 34 are encapsulated in a conformal material 36, and interconnection is accomplished by traces on a flexible polymer film 32 shown as overlaying the encapsulated structure. In this structure the ICs are not packaged in the conventional manner having solder leads for assembly to a printed circuit board. Rather, connections are made directly between the solder pads on the chip and the traces on the Kapton film. Also there is no intention to relate ICs indicated by element No. 34 with specific functional ICs in a µPDA. This cross-section is illustrative of a method of construction only.

In this compact construction there may also be traces on the side of film 32 away from the interconnections for the CPU and memory for connection to other elements, such as display 25 and touch-sensitive screen 27.

LCD display 25 is implemented on one side of the µPDA, and touch-sensitive interface 27 is provided overlaying at least a portion of the LCD display. A metal casing 38, or other suitable material or combinations of material, surrounds the internal components and conforms to Type II PCMCIA form factors. This simplified cross-section illustrates some of the principles of construction that can allow the needed components to be inexpensively fitted into the small form factor needed. In another embodiment the µPDA is implemented in the form factor of a type III (10 mm thick) PCMCIA unit, using relatively conventional technology, such as PCB technology, rather than the encapsulated construction described immediately above. Various other constructions, form factors, and combinations are possible, as well.

Figure 3:
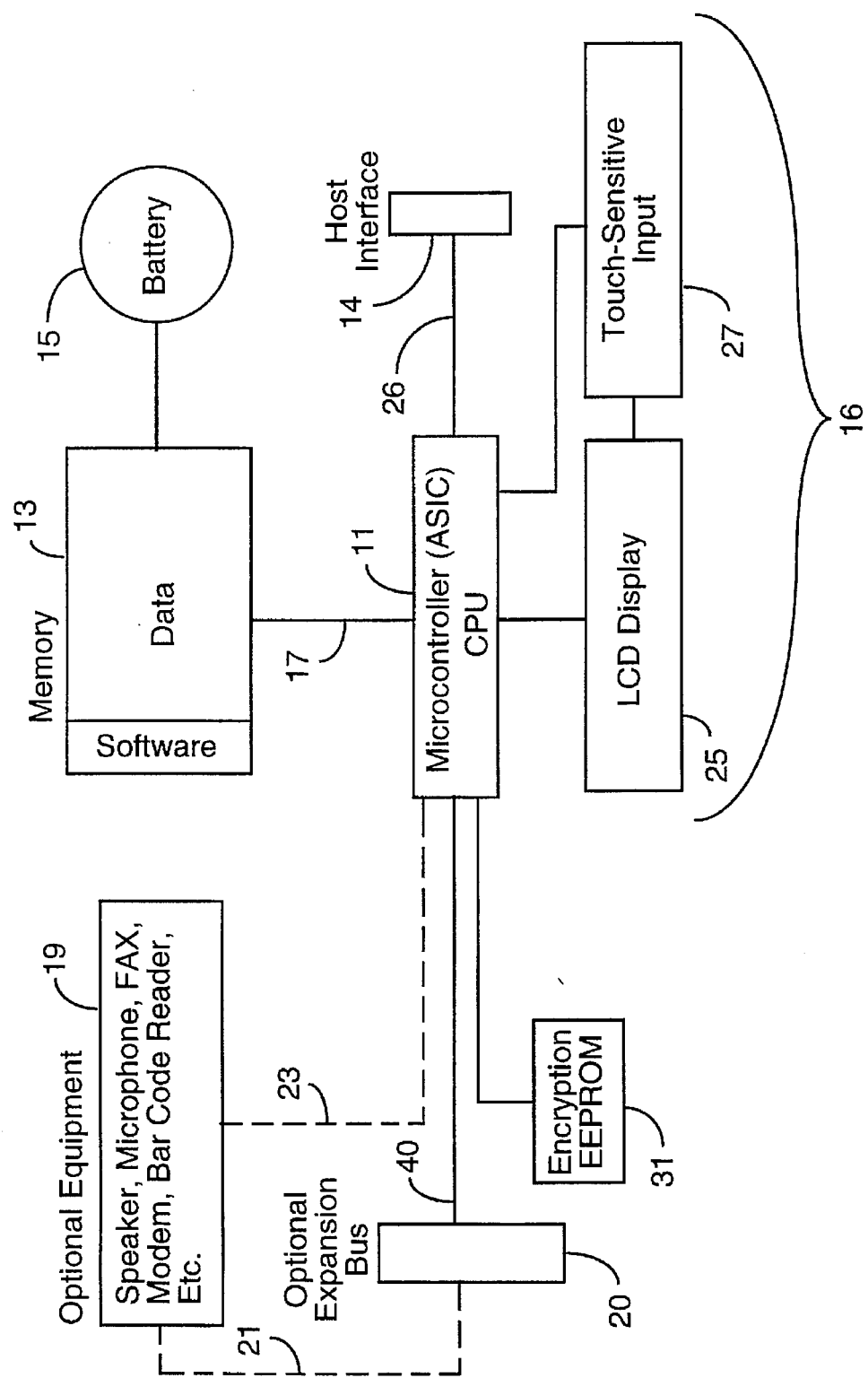
FIG. 3 is a block diagram of the μPDA of FIG. 1A and some peripheral elements.

FIG. 3 is a simplified electrical block diagram of the µPDA of FIGS. 1A, 1B and 2. A unique microcontroller 11 acts as the CPU of the µPDA in the stand-alone mode, that is, when the µPDA is not docked in a host unit. When the µPDA is docked in a host computer, microcontroller 11 acts as a slave unit, granting bus control to the CPU of the host. In docked mode, the CPU of the host thus gains control of the memory contents of the µPDA, subject in most cases to security procedures which are described below. Thus the host computer can transfer data and software into and out of a docked µPDA memory. In other embodiments many other cooperative operating modes may be accomplished between the two CPUs and accessible memory devices.

Memory 13 is preferably a nonvolatile device from 1 to 2 megabytes in this embodiment, and both control routines for applications and data files are stored in this memory. Memory 13 may be flash memory, CMOS ROM, CMOS RAM with battery, or a combination, with the software stored in ROM and the data in the flash memory. The memory device is interfaced to microcontroller 11 via a dedicated bus structure 17, and microprocessor 11 is configured to drive memory bus 17.

A battery 15 is the power source in the stand-alone mode, and may be recharged in one or more of several ways. The power traces are not shown in FIG. 3, but extend to all of the powered devices in the µPDA module. When the unit is docked in the host, the host power source may be connected to pins through the host interface to recharge the battery. Alternatively, an attached means such as a solar panel may be configured to charge the battery and/or provide power to the µPDA. A solar panel for power is described elsewhere in this disclosure. Also the battery may be easily removed for periodic replacement.

Host bus connector 14 is a part of a host interface which comprises a bus structure 26 for providing connection to the host in docked mode, as described above. In a preferred embodiment, the host interface is according to PCMCIA Type II, Rev. 3 standard, which is capable of communication either in PCMCIA mode or in a mode similar to PCI mode. PCI mode refers to a high-speed intermediate bus protocol being developed by Intel corporation, expected to become a standard bus architecture and protocol in the industry. The physical interface at the host in this embodiment is a slot-like docking bay, as is typical of know docking bays for PCMCIA devices. This docking bay may be implemented as a docking box, a built-in unit like a floppy-drive unit, or it may take some other form.

Connector portion 20 is a part of the expansion bus interface described above, comprising a dedicated bus structure 40 connected to microcontroller 11. This interface can be implemented in a number of different ways. The purpose of the optional expansion bus interface is to connect to optional peripheral devices, such as a printer, a FAX modem, a host cellular phone, and others. The expansion bus interface is not an essential feature in a minimum embodiment of the present invention, but provides vastly enhanced functionality in many embodiments.

The expansion interface can take any one of several forms. A preferred form is an extended enhanced parallel port and protocol based on an invention by the present inventors disclosed in a copending patent application. Another form is an indexed I/O port having 8-bit address and 8-bit data capability. The requirement of the expansion port is that the connection and communication protocol be compatible with expansion devices, such as telephone modems, fax modems, scanners, and the like. Many other configurations are possible.

Optional equipment such as devices listed in box 19 may be connected for use with the µPDA through the expansion bus. Selected ones of such devices may also be built in to the µPDA in various embodiments, providing variations of applicability. In the former case, connection is through path 21 and the expansion bus interface via connector portion 20. In the built-in case, connection is in the interconnection traces of the µPDA as indicated by path 23.

I/O interface 16 (also FIG. 1B) is for viewing µPDA application-related data and for touch-sensitive input via softkeys. By softkeys is meant assignment by software of various functions to specific touch sensitive screen areas, which act as input keys. Labels in I/O interface 16 identify functionality of the touch-sensitive areas in various operating modes according to installed machine control routines. LCD display 25 and the touch-sensitive area 27 together form the combination I/O interface 16 described also above.

In some embodiments of the present invention, data and program security is provided comprising an Electrically Erasable Programmable Read Only Memory (EEPROM) 31, which is connected by dedicated communication lines to microcontroller 11. EEPROM 31 holds one or more codes installed at the point of manufacturing to provide security for information transfer between a host and a µPDA. The purpose is to control access by a host to the memory contents of a µPDA, so each µPDA may be configured to an individual. To accomplish this, docking and bus mastering machine control routines are initiated at the point of docking, and this security process is described in more detail below. In other embodiments, security codes may be provided by a Read Only Memory (ROM) chip or other permanent or semi-permanent memory source.

Figure 4:
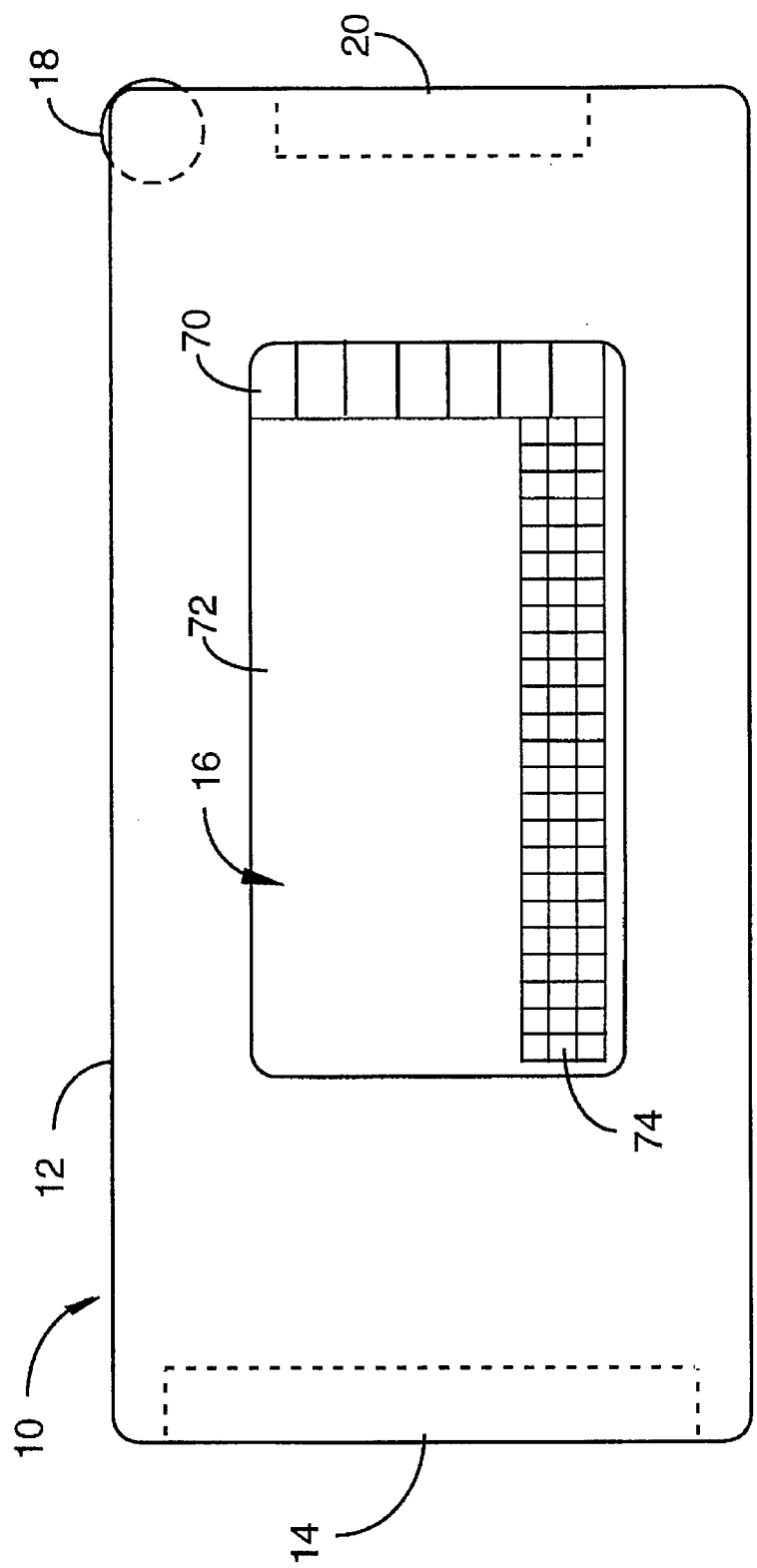
FIG. 4 is a more detailed plan view of the μPDA of FIG. 1A showing in particular an LCD display and touch screen user interface in an aspect of the present invention.

FIG. 4 is a plan view similar to FIG. 1B, of a µPDA, showing in particular I/O interface 16. The size and location of I/O interface 16 may vary, but in general occupies a major portion of one of the sides of the module. In one embodiment I/O interface 16 comprises an LCD display with a resolution of 256 by 144 pixels in a screen size that displays 32 by 12 characters. Each character in this embodiment is displayed in an area eight pixels wide and twelve pixels high. In another embodiment, the pixel resolution is 320 by 200, which corresponds to 40 by 16 characters.

The touch-sensitive areas of the touch-sensitive screen correspond to the character areas of the display. By touching an area with a finger or stylus, data can be entered quite quickly and with minimal CPU demand.

At one corner, thumbwheel 18 provides a two-directional means of controlling the configuration of the display according to installed control routines. A menu 70 is configured at one side to represent the current status of any application in progress and to provide appropriate user menu selections. In a preferred embodiment input from thumbwheel 18 is used for scrolling through menu 70, and active areas may be indicated by a cursor. A user makes a menu selection by pressing the appropriate touch-sensitive area. A specific input may be provided to cause the menu area to be displayed on either side of the display according to a user's preference.

Specific characters are displayed in this embodiment in a region 74, with each character area associated with a touch-sensitive input area. As region 70 dedicated to selectable characters is much too small to display all characters of a standard keyboard, input from thumbwheel 18 allows a user to pan region 74 displaying an entire virtual standard keyboard. Movement of thumbwheel 18 in one direction pans the character region horizontally, and movement in the other direction pans the character region vertically. When an end is reached the window pans onto the virtual keyboard from the other end. In this manner, a user may quickly pan the character window to display an entire standard keyboard, and make selections with a finger or a stylus. Of course, it is not required that a virtual keyboard be laid out for access in the format of a standard keyboard. Characters and punctuation, etc., could just as simply be displayed in a single strip along a region of the display, and scrolled by input from the thumbwheel or other pointer-type input device.

In this embodiment, to avoid delays caused by panning, if the thumbwheel is rotated quickly the character window jumps rather than scrolling to speed up the interface. In addition, menu 70 may optionally provide for a character display in different fonts and sizes, although a single font is preferred to minimize memory demand. It will be apparent to those with skill in the art that there are many alternatives for character selection and display, and many ways thumbwheel 18 may be configured to allow for scrolling and panning.

A document window 72 is provided in this embodiment at the top or bottom of I/O interface 16. A cursor locates the active position within the document for editing purposes. Menu 70 provides selection of available fonts, and input by thumbwheel 18 controls cursor movement over the document. As a document will in almost all cases be much larger than the display capability of region 72, it is necessary to pan the document window in essentially the same manner as the keyboard window is panned. For example, rotating thumbwheel 18 in one direction may display horizontal strips of a document, while rotating the thumbwheel in the opposite direction moves the window vertically strips of the same document.

A soft key or optional hard key may be configured to switch between the document and keyboard window, and the same or another key may be configured to switch between scrolling left or right, up or down, document or keyboard. A switch key may be used to change the thumbwheel mode of operation. A switch key may also be used in combination with a floating pointer to select characters and menu items. In this embodiment, the user can keep his or her hands relatively stationary on just the thumbwheel and the switch key, making all possible selections. Use of a a switch key in combination with a floating pointer facilitates the use of small fonts. A switch key may also be incorporated as an additional hard key in a convenient location on the case 12.

It will be obvious to a person skilled in the art than there are numerous ways to combine menu selections, switching keys and I/O configurations to provide a user-friendly user interface. A further embodiment of the present invention provides an I/O set-up application wherein a user may completely customize features of I/O area displays.

There are other sorts of mechanical interfaces which may be used to provide pointer-style input in different embodiments of the invention as alternatives to the thumbwheel disclosed. One is a four-way force-sensitive mouse button and a selector button, which may be located at opposite ends of case 12 below I/O interface 16. Each button is designed to be operated by one finger. The four-way force-sensitive mouse button can provide menu scrolling of a cursor and panning and/or indexing of keyboard and document windows, while the selector button is used to select and edit according to position of a cursor. This configuration minimizes hand movement and keeps the I/O area clear for viewing.

Implementation of thumbwheels, pressure-sensitive switches and buttons, and the like, are known in the art, including the translation of mechanical motion and pressure to electrical signals and provision of such signals to a microcontroller. For this reason, details of such interfaces are not provided in this disclosure. Combinations of such inputs with displays and input areas may, however, be considered as inventive.

Figure 5:
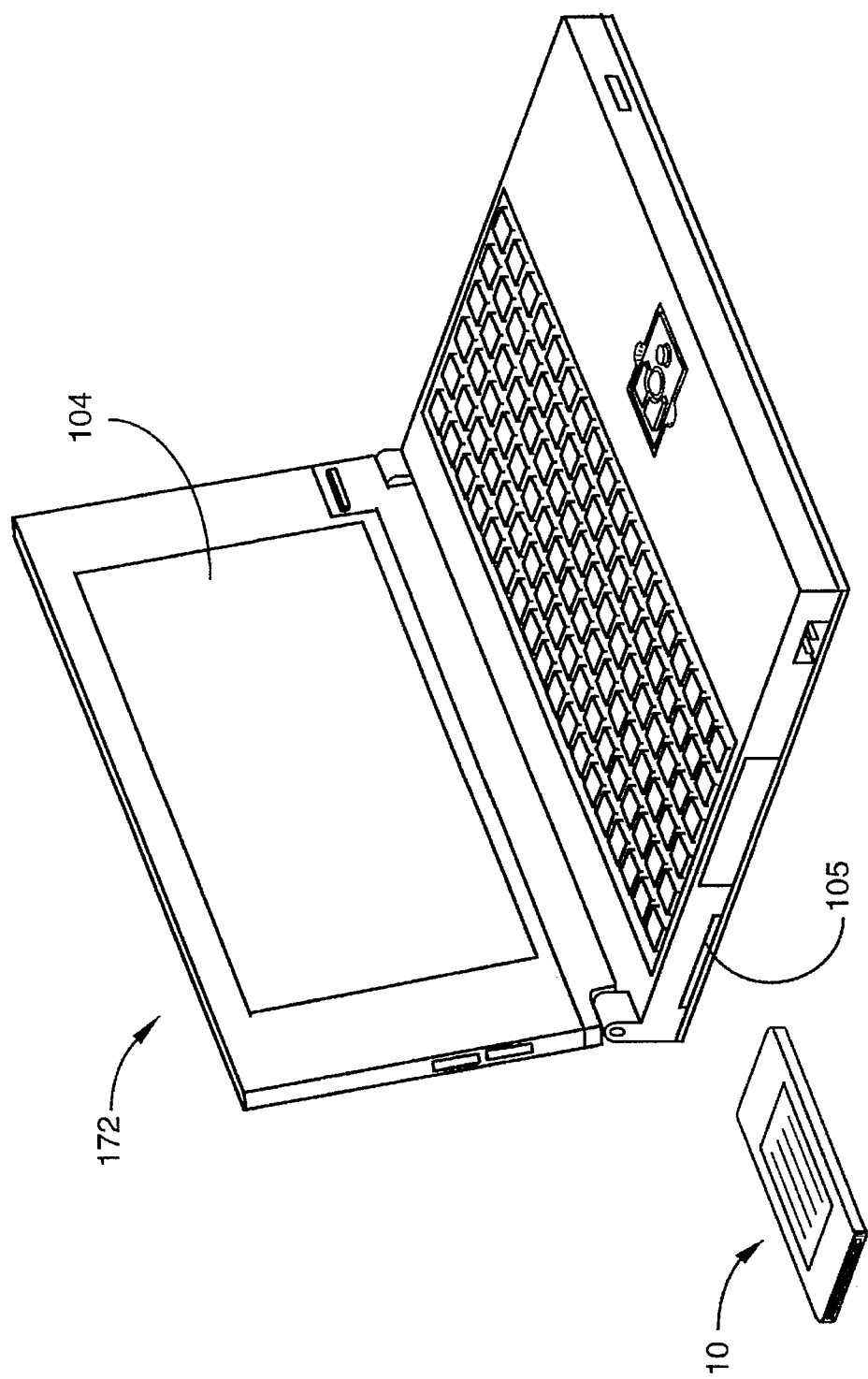
FIG. 5 is an isometric view of a μPDA and a host notebook computer in an aspect of the present invention, with the μPDA about to be docked in a docking bay of the notebook computer.

FIG. 5 is an isometric drawing of a μPDA 10 in position to be docked in a notebook computer 172 via a Type II PCMCIA docking port 105 according to an embodiment of the present invention. As further described below, once the μPDA is docked, it is activated and a procedure is initiated with the host computer to manage communication and verify memory access rights (security).

Access rights are considered important by the inventors for a number of reasons. Firstly, through the expedient of one or more specific codes, unique to each μPDA, a user may protect files stored in his module from access by unauthorized persons. The code can be used both to control access to data and files via I/O interface 16, and also through the host bus interface, so data and files may be secure from access by an unauthorized host system.

In the former case, when a μPDA is powered up, an application routine can query the user for an access code to be entered at I/O interface 16 FIG. 4). If the code is not entered properly, access is denied, and power goes off. Codes for the purpose are stored in EEPROM 31 (FIG. 3), or in whatever ROM device may be devoted to the purpose. In some embodiments, the code may by mask-programmed at manufacture, so it is not alterable. In others, the code may be accessible and changeable by special procedures in the field.

In the case of host communication, it is possible that a portable or desktop computer, or some other device, may have a docking port physically configured to receive a μPDA, yet not be configured to communicate with the μPDA. This certainly might be the case where the μPDA is in the PCMCIA form. For purposes of disclosure and description, this specification terms such a unit a generic host. If the unit is configured to communicate with a μPDA it is an enabled host. If a host is configured for full access to a particular μPDA, it is a dedicated host.

If a docking unit is a generic host, there will be no communication unless the person presenting the μPDA provides the control routines to the host. This may be done for a generic host such as by transfer from a floppy disk, from a separate memory card through the docking port, or, in some embodiments, the communication software may be resident in memory 13 (FIG. 3) of a docked μPDA, transferrable to the host to facilitate further communication.

If the docking unit is in fact an enabled host, or is configured after docking to be an enabled host, the stored code or codes in EEPROM 31 (or other storage unit) may be used to verify authorization for data and program transfer between the host and a μPDA. In one embodiment this procedure is in the following order: First, when one docks a μPDA in a compatible docking port, certain pin connections convey to both the μPDA microcontroller and to the host CPU that the module is docked. Assuming an enabled host, the fact of docking commences an initialization protocol on both systems.

In most embodiments, if the docking unit is a non-host, that is, it is not capable of communication with the docked module, nothing happens, and the user may simply eject the docked module. If the computer is an enabled host, an application is started to configure host access to the μPDA's data files through the μPDA microcontroller. A user interface, described more fully below for a particular embodiment, is displayed on the host monitor 104 (FIG. 5). The host interface menu, as well as other application menus, may be formatted in part as a display of the μPDA I/O interface 16 as seen in FIG. 4 and described in accompanying text. In some embodiments, the docked μPDA can be operated in situ by manipulating the input areas of the μPDA displayed on the host's screen.

If the host is not a home unit for the docked module, that is, the host does not have matching embedded ID codes to those stored in the docked module, a visitor protocol is initiated. In this event, a visitor menu is displayed on host display 104 for further input, such as password queries for selections of limited data access areas in the docked module. In this case, too, a user may gain full access to the docked module's memory registers by entering the proper password(s).

If the host is a fully compatible host home unit, full access may be immediately granted to the host to access memory contents of the docked module, including program areas; and both data and programs may be exchanged.

In any case, when the μPDA is ejected or otherwise removed from the docking port, the on-board module microcontroller again gains full control of the internal μPDA bus structures.

Figure 6:
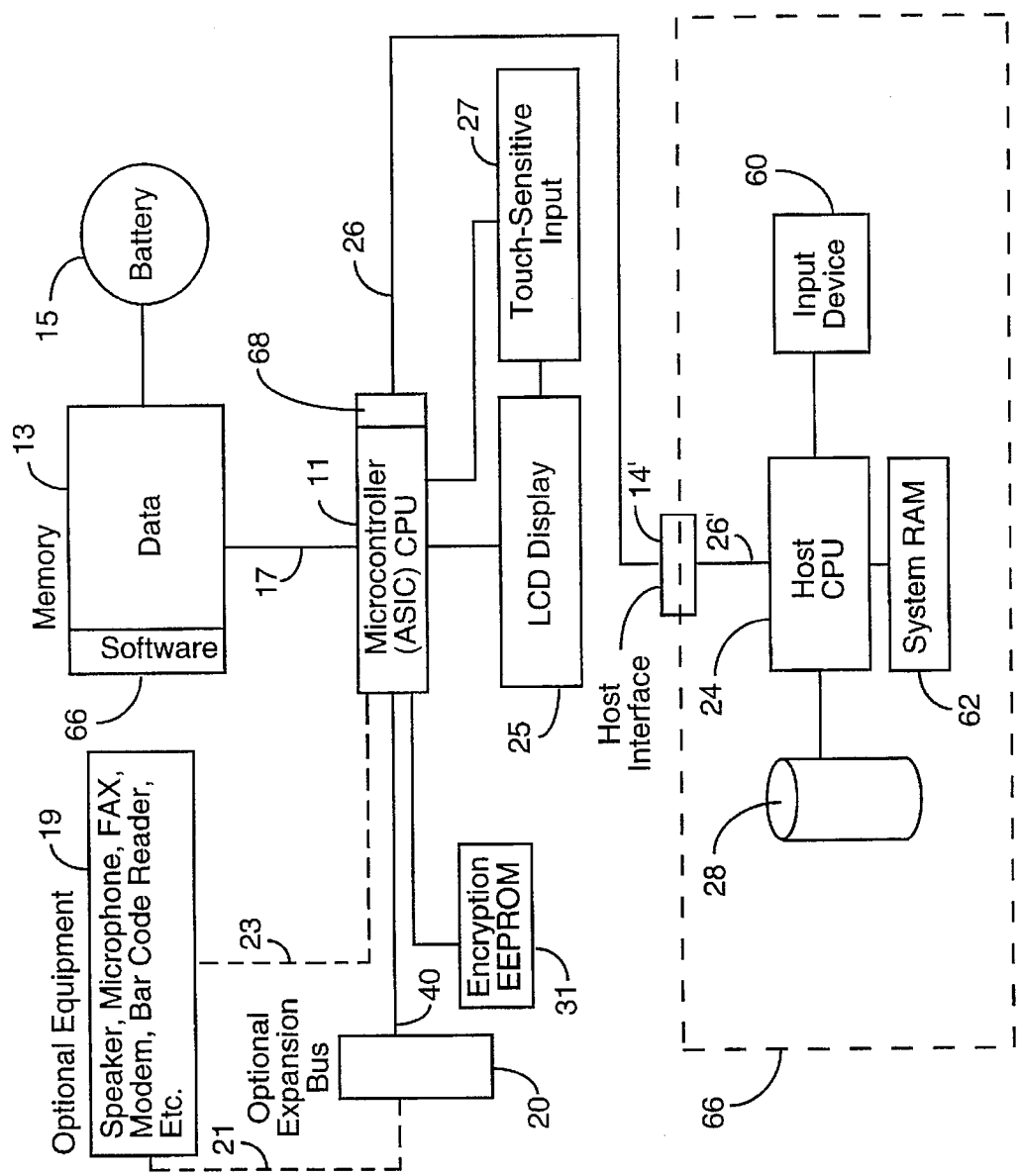
FIG. 6 is a block diagram of a μPDA docked in a docking bay of a host computer according to an embodiment of the present invention.
Figure 7:
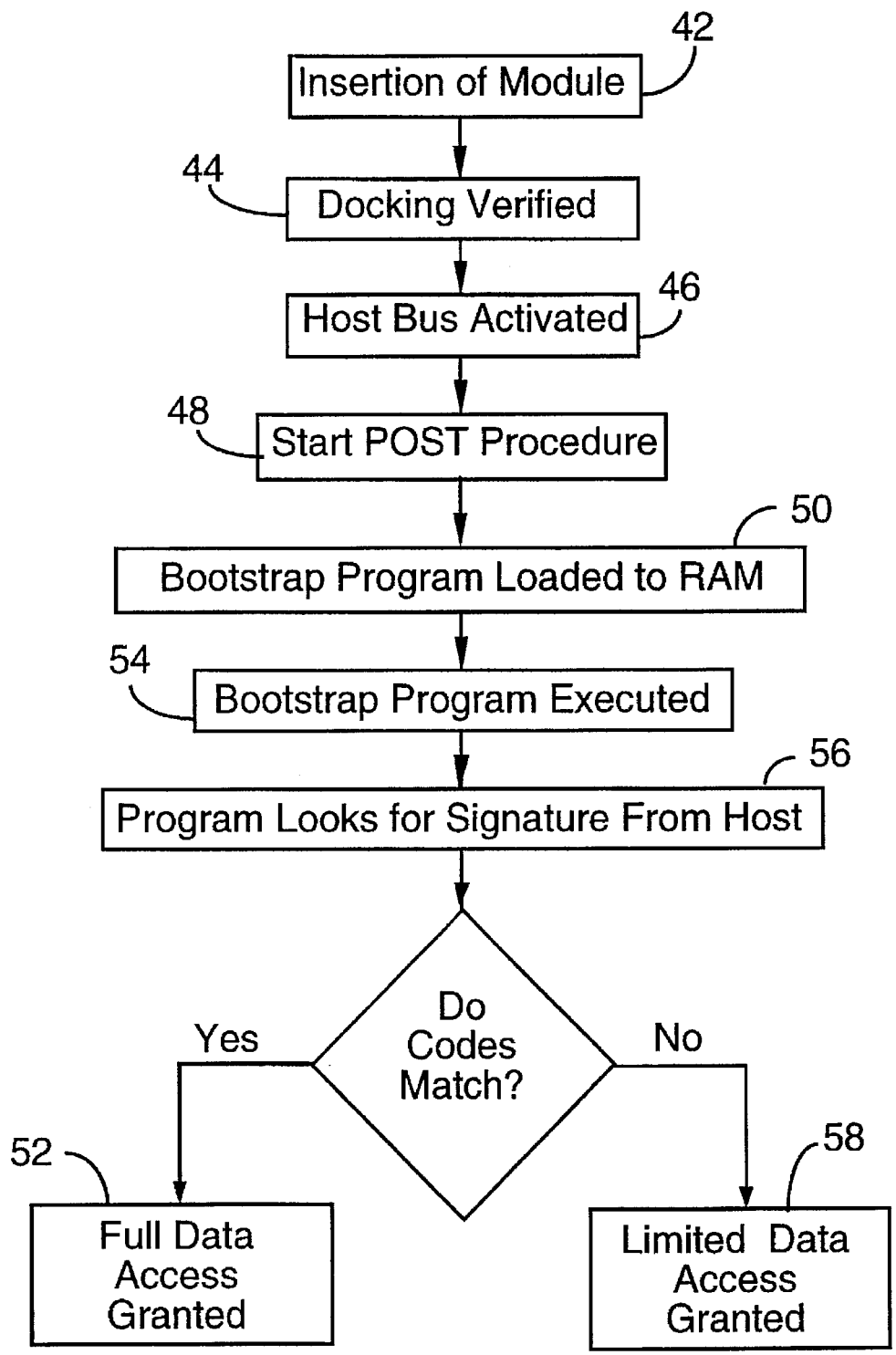
FIG. 7 is a logic flow diagram of the steps in docking a μPDA in a host computer according to an embodiment of the present invention.

FIG. 6 is a simplified block diagram of a μPDA docked in a host computer, and FIG. 7 is a basic logic flow diagram of the steps involved in docking a μPDA in a host computer 66 according to an embodiment of the present invention. Host computer 66 is represented in a mostly generic form, having a host CPU 24, and input device 60, such as a keyboard, a mass storage device 28, such as a hard disk drive, and system RAM 62. It will be apparent to those with skill in the art that many hosts may have a much more sophisticated architecture, and the architecture shown is meant to be illustrative.

When a μPDA unit is docked, connector 14' in FIG. 6 comprises portion 14 shown in FIGS. 1B and 3 and a mating connector portion for engaging portion 14 in port 105 (FIG. 5). The engagement of the separate portions of the connector cause bus 26 in the µPDA and bus 26' in the host to become directly connected. There is then a direct bus path between microcontroller 11 and host CPU 24 (FIG. 6).

As previously described there is a pin configuration (not shown) in connector 14 dedicated to signalling that a module is docked. In FIG. 7, step 42 represents insertion of a µPDA module into the docking port. At step 44 the signalling pin configuration signifies physical docking is accomplished. At step 46 host interface bus 26 is activated, including the mated host bus 26' in the host.

At step 48 (FIG. 7) microcontroller 11 in the µPDA starts a preprogrammed POST procedure. Microcontroller 11 in this embodiment has a page of RAM 68 implemented on the microcontroller chip. In other embodiments RAM may be used at other locations. At step 50, the POST routine loads a bootstrap program to RAM 68, which includes a code or codes for security matching. This code or codes comprise, for example, a serial number.

At step 54 the bootstrap program begins to execute in microcontroller 11, and at step 56 the microcontroller looks for a password from the host on host interface bus 26 (FIG. 6).

The fact of docking, assuming an enabled or dedicated host, also causes a communication routine, which may be accessed from, for example, mass storage device 28 at the host, to display a user interface on monitor screen 104 of the host unit, as partly described above. It is this communication program that makes a generic host an enabled host.

Assuming an enabled, but not dedicated, host, the user interface will query a user for input of one or more passwords, after successful entry of which the host will pass the input to microcontroller 11 for comparison with the serial number and perhaps other codes accessed from EEPROM 31 in the bootstrap of the µPDA.

According to the codes passed from the host to the docked module, microcontroller 11 will allow full access to memory 31 at function 52, FIG. 7, for the host CPU, or limited access at some level at function 58, defined by received codes (or no matching code at all).

The access protocols and procedures allowing partial or direct access to µPDA memory 13 are relatively well known procedures in the art, such as bus mastering techniques, and need not be reproduced in detail here. In addition to simple comparison of codes, there are other techniques that may be incorporated to improve the integrity of security in the communication between a µPDA and a host. For example, within the limitation of storage capacity of the EEPROM or other nonvolatile source, executable code might also be uploaded to onboard RAM 68, or code keys to be used with executable code from other sources, or relatively simple maps re-allocating memory positions and the like, so each µPDA may be a truly unique device.

There are additional unique features provided in one aspect of the invention as part of the communication routines introduced above. One such feature is automatic updating and cross-referencing of existing files and new files in both computers, under control of the host system, with the host having direct bus access to all memory systems. Auto-updating has various options, such as auto-updating by clock signature only, flagging new files before transfer, and an editing means that allows the user to review both older and newer versions of files before discarding the older in favor of the newer. This automatic or semiautomatic updating of files between the satellite and the host addresses a long-standing problem. The updating routines may also incorporate a backup option to save older files.

Another useful feature in host/µPDA communication is a means for a user to select and compose a mix of executable program files for downloading to a µPDA, either replacing or supplementing those executable routines already resident. A user can have several different program lists for downloading as a batch, conveniently configuring the applicability of a µPDA among a wide variety of expected work environments.

Such applications as databases, spreadsheets, documents, travel files such as currency converters, faxing and other communications programs, time clocks, address and telephone records, and the like, may comprise customized lists of user-preferred applications.

In another embodiment, an undocked µPDA can transfer data via the optional expansion bus 40 (FIG. 3) directly to a host. In the special case of a µPDA user without access to a PCMCIA interface on his host (notebook or desk-top) computer, he or she can connect to a host via an auxiliary port on the host, such as a serial port, via the expansion bus interface. In this case, the µPDA still requests password(s) from the host, and controls access to its on-board memory according to the password(s) received.

The optional expansion interface may also be used in some embodiments while a µPDA is mastered by a host, wherein the host may effectively send data through the bus structures of the µPDA.

Additional Aspects and Features

Software Vending Machine:

In a further aspect of the invention, a Software Vending Machine with a very large electronic storage capacity is provided, wherein a µPDA user may dock a module and purchase and download software routines compatible with the µPDA environment.

Figure 8:
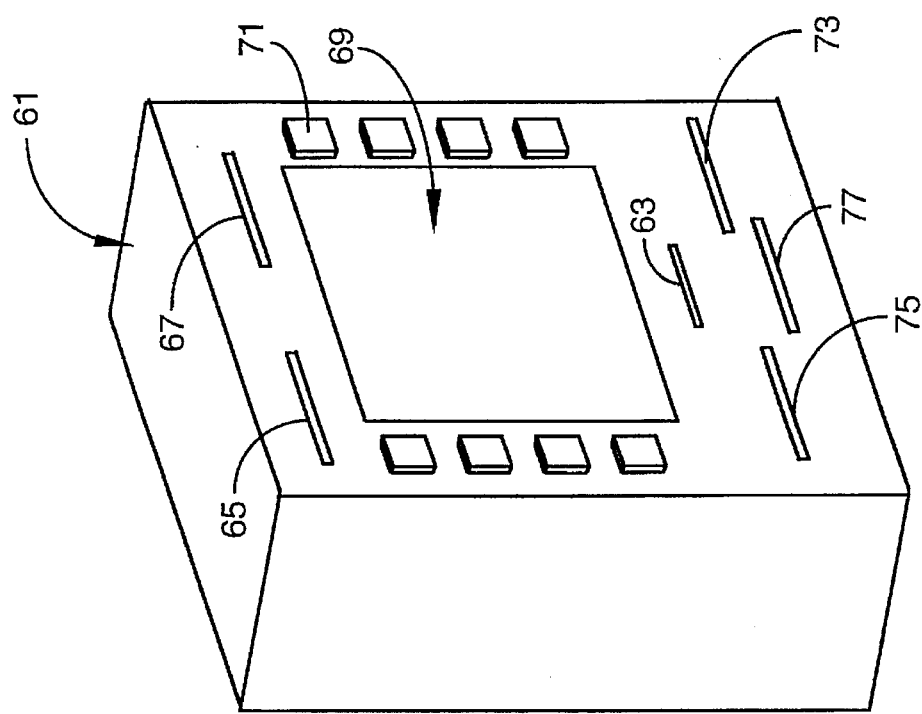
FIG. 8 is an isometric illustration of a μPDA software vending machine in an aspect of the present invention.

FIG. 8 is an isometric view of such a vending machine 61 having a docking bay 63 for a µPDA, a credit card slot 65, and a paper money slot 67. A display 69 provides a user interface for reviewing and purchasing software from the vending machine, along with selector buttons such as button 71 along the sides of the display. In an alternative embodiment the display may also have a touch screen, and may, in some embodiments, emulate the µPDA I/O area on a larger scale.

In operation, a user may, in this embodiment, review software for sale simply by docking his µPDA unit in the vending machine and selecting from a menu on display 69. The menu may allow the user to browse all available applications, or list new applications since entered dates. The user can select certain applications, try them out, at least in simulation, and then select applications to purchase.

The vending machine, once all the requirements are met, such as proper identification and payment, copies the selected application(s) to the memory of the µPDA, or, alternatively, to a floppy disk provided by either the user or the vending machine. In this case there is also a floppy disk drive 73 in the vending machine and a port 75 for dispensing formatted floppies for a customer to use in the disk drive. This mode is useful for the instances where a user's µPDA is loaded beyond capacity to receive the desired software, or the user simply wishes to configure the software mix himself from his or her own host computer.

There may also be provided a backup option so a user may instruct the vending machine to read and copy all or a selection of his files to one or more floppy disks before installing new files or data.

As described above, each user's µPDA includes an EEPROM or other storage uniquely identifying the µPDA by a serial number or other code(s), so the vending machine may be configured in this embodiment to provide the software in one of several modes.

A user may buy for a very nominal price a demo copy of an application, which does not provide full capability of the application, but will give the user an opportunity to test and become familiar with an application before purchase. Also, the user may buy a version of the same application, configured to the ID key of the µPDA to which it is loaded, and operable only on that µPDA. In another embodiment, the software is transferable between a family of keyed µPDAs, or has the ability to "unlock" only a limited number of times. In these cases, the applications would be sold at a lesser price than an unlocked version. The unlocked version works on any µ-PDA and/or host/µPDA system. The higher price for the unlocked version compensates for the likelihood of unauthorized sharing of the vended applications.

The vending machine could also offer a keyed version, customized to operate only on the µPDA docked in the software vending machine, or upon a family of µPDAs. This keyed version is possible because of the individual and unique nature of each µPDA, which has, at a minimum, a unique serial number, and may also have other security programming, as described above, which allows a vending machine to prepare and download a customized copy of an application that will operate only on the particular module for which it is purchased.

There are a number of different means by which unique correspondence might be accomplished, as will be apparent to those with skill in the art. A standard version stored in the memory facility of a vending machine might be recompiled, for example, on downloading, using a unique code from the docked or identified µPDA as a key in the compilation, so only the specific µPDA may run the program by using the same unique key to sequence the instructions while running. The key for scrambling or otherwise customizing an application might also comprise other codes and/or executable code sequences stored uniquely in a µPDA.

In yet another aspect related to the vending machine, there is a printer outlet 77 which prints a hardcopy manual for the user. It is, of course, not necessary that the software vended be specific to the M-PDA. Applications may also be vended for other kinds of machines, and transported in the memory of the µPDA, or by floppy disk, etc. In this embodiment a non-µPDA user can acquire a wide assortment of software.

The software vending machine may also serve as an optional informational display center in such locations as airports, train stations, convention centers, and hotels. Upon inserting a µPDA a user may interface directly and upload current information including, but not limited to, local, national, and world news; stock quotes and financial reports; weather; transportation schedules; road maps; language translators; currency exchange applications; E-mail and other direct on-line services.

A customized vending machine could be tailored to business travelers and allow fast access to pertinent information, allowing the user to download files to send via E-mail. In another aspect of the invention, the vending machines are linked to each other allowing users to send messages to associates travelling through locations of associated vending machines. Such dedicated µPDA E-mail is immediately downloaded to a specific µPDA as it is docked. The sender may have the associate's µPDA unique encoded key as identification, or some other dedicated identifying means for E-mail.

In another embodiment, as each business associate arrives at an airport, he or she may prompt the custom vending machine in that location via an optional installed infrared interface (not shown) in their µPDA. The custom vending machine, also equipped for infrared communication, receives the signal and sends/or receives any messages that are waiting.

Figure 9:
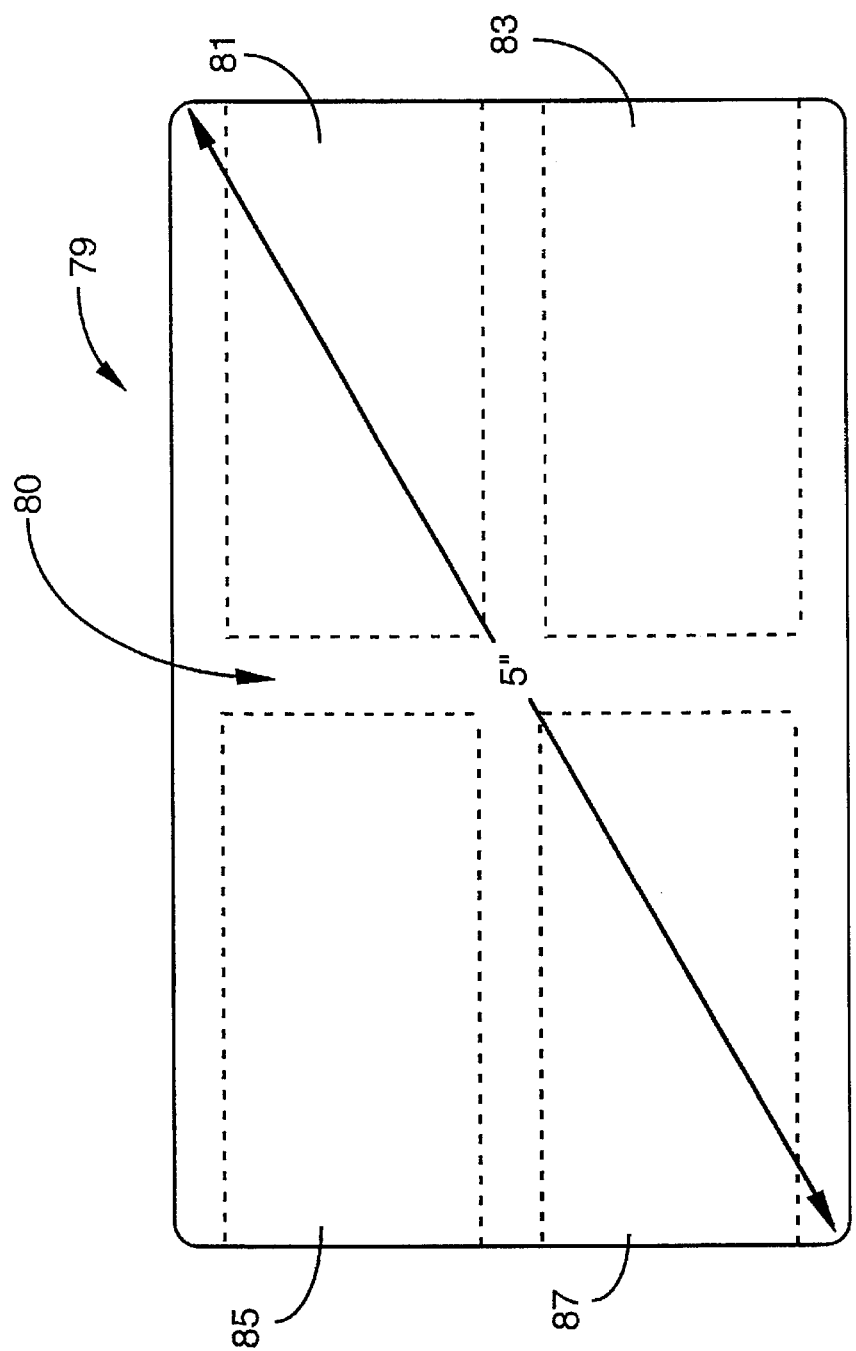
FIG. 9 is a top plan view of a μPDA enhanced user interface according to an embodiment of the present invention.

Enhanced Display:

FIG. 9 is a plan view of an enhanced I/O interface unit 79 according to an aspect of the present invention. Interface unit 79, with about a 5-inch diagonal measurement, comprises a combination LCD display at least partially overlaid by a touch-sensitive input screen, providing an I/O area 80 in much the same manner as in a µPDA. Four docking bays 81, 83, 85, and 87 are provided in the left and right edges of interface unit 79 in this embodiment, and are configured for PCMCIA type II modules. One of these bays may be used for docking a µPDA according to the present invention, and the other three to provide a larger CPU, additional memory, battery power, peripheral devices such as modems, and the like by docking functional PCMCIA modules.

Interface unit 79 is a framework for assembling a specialty computer through docking PCMCIA units, including a µPDA according to the present invention. In other embodiments where the µPDA assumes other form factors, the docking bays may be configured accordingly.

A docked µPDA in this embodiment is configured to produce its I/O display on I/O area 80. The thumbwheel on the M-PDA is accessible while docked and acts as described above in the stand-alone mode in this case. In another aspect, the enhanced display has a re-configured output that enables the user to manipulate the data from the touch-screen alone and/or additional hardware selector buttons and/or a standard keyboard attached to the enhanced display via a dedicated bus port, or even through the expansion port of a docked µPDA. In a further embodiment the enhanced display has a dedicated mouse port and/or a dedicated thumbwheel.

In yet another embodiment, interface unit 79 has an inexpensive, conventional, replaceable battery and/or a rechargeable battery. Also, in another aspect, interface unit 79 may dock two or more individual µPDAs and cross-reference data files between them according to control routines that can manipulate mutually unlocked files. Further still, interface unit 79 may be placed and structurally supported for easy viewing on a dedicated standard or smaller-sized keyboard, connecting to the keyboard as an input device. The keyboard would then automatically serve as the input device.

Interface unit 79 for a µPDA is small and compact enough to slip into a pocket book or briefcase, providing a very portable, yet very powerful, computer.

Figure 10:
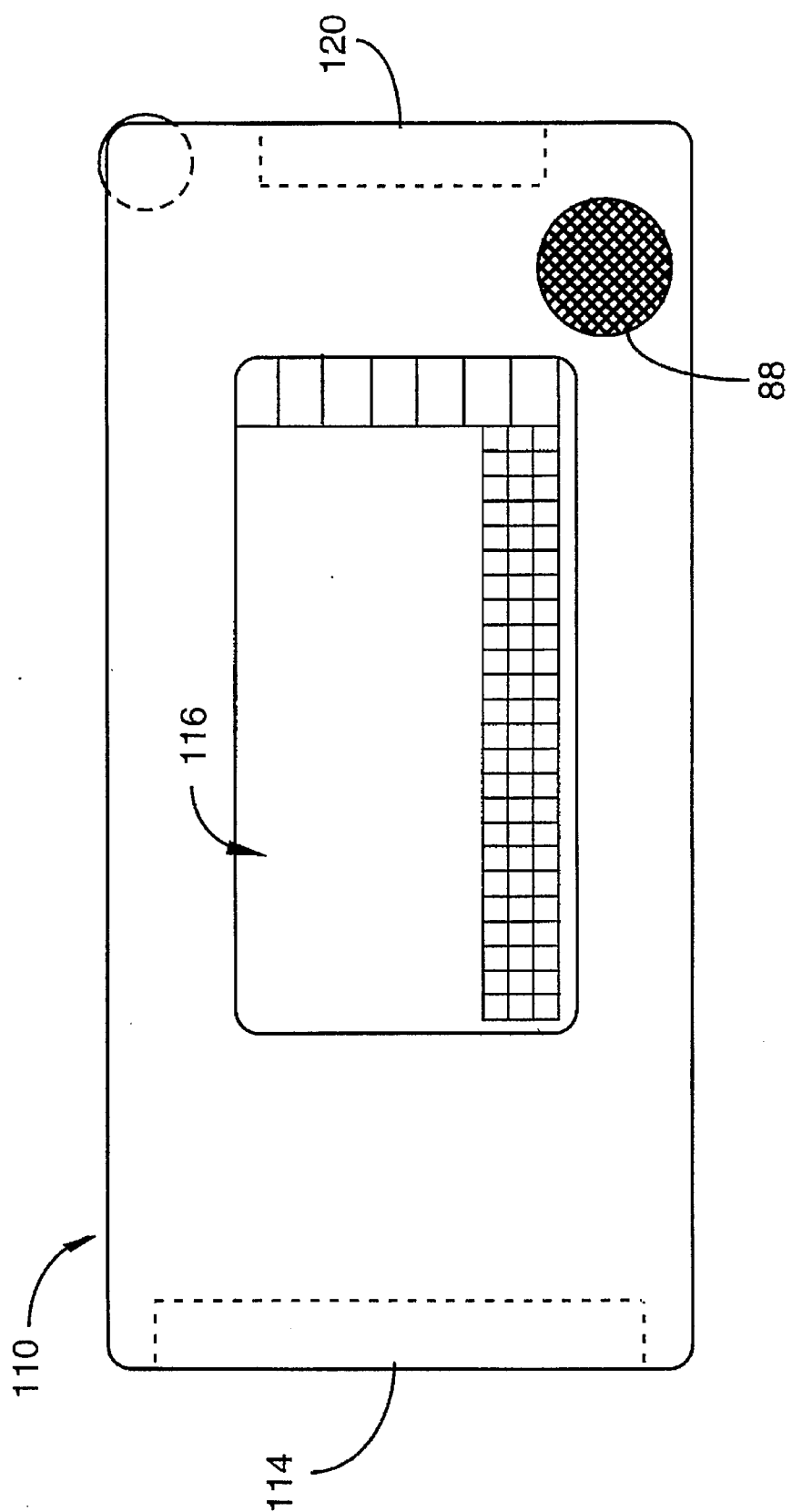
FIG. 10 is a top plan view of a μPDA with a microphone in an embodiment of the present invention.

Microphone/Voicenotes:

FIG. 10 is a plan view of a µPDA 110 with an I/O interface 116, an expansion port 120, and a host interface connector 114. µPDA 110 has all the features previously described and additionally a microphone 88. In this embodiment, control routines in the µPDA use a linear pedictive coding (LPC) approach to convert analog input from the microphone to a digital voice recording. This approach uses a minimum of memory, but still is capable of reproducing audio input like the human voice within recognizable limits.

In an alternative embodiment, for better quality voice recording, a two-step integrator may be used in order to separate the analog signal and synthesize a closer digital representation.

With a µPDA so configured, a user's voice notes can be recorded and later uploaded to a host for processing. In future embodiments the digital signals may be converted to text or sent as voicemail on a network. In yet another embodiment, the microphone is integrated with a speaker for editing purposes.

Figure 11:
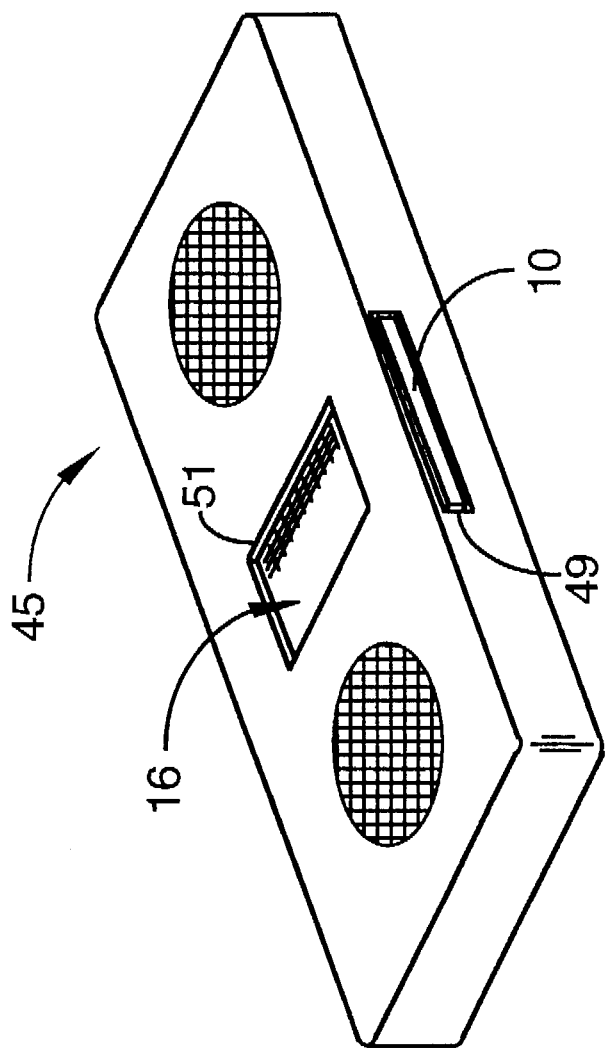
FIG. 11 is an isometric drawing of a μPDA docked in a dedicated cellular or cordless telephone according to an embodiment of the present invention.

Cellular Telephone Interface:

FIG. 11 is an isometric view of a μPDA 10 docked in a dedicated cellular telephone 45 according to an embodiment of the present invention. Telephone 45 has a docking port 49 for a μPDA according to the invention. In this embodiment, port 49 is on one side of telephone 45, and there is a window 51 to provide access to I/O interface 16 of the μPDA after it is docked. With the μPDA docked, all of the software and memory of the μPDA is available to the telephone and a user may operate the phone by I/O interface 16.

In this aspect of the invention, unique control routines and display configurations are provided to enhance use of the cellular phone. For example, all of the user's collection of phone numbers, associated credit card numbers, access codes, etc. are readily available and may be quickly and conveniently accessed and used. In one aspect, a simple input displays alphabet letters to select, and once a letter is selected, a partial list of parties that might be called is displayed. One may scroll through the list by touch input or by use of the thumbwheel of the μPDA and select a highlighted entry. It is not required that the telephone numbers be displayed.

Once a party to be called is selected, the μPDA dials the call, including necessary credit card information stored in the memory of the μPDA for this purpose.

In a further embodiment, the calls are timed and timestamped and a comprehensive log, with areas for notes during and after, is recorded.

In another embodiment, conversations are digitally recorded and filed for processing later. A future embodiment may include a voice compression program at a host or within cellular phone 45. Compressed voice files, such as, for example, messages to be distributed in a voicemail system, may be downloaded into the μPDA or carried in a larger memory format inside the cellular telephone. The μPDA can then send the files via a host or dedicated modem attached at connector portion 20 to the optional expansion bus 40 (FIG. 6).

The cellular telephone may, in this particular embodiment, have a bus port for digital transmission. In this case, the compression algorithm along with voice system control routines are also established at the receiving end of the transmission to uncompress the signal and distribute individual messages.

In a further embodiment, voice messages may be sent in a wireless format from the cellular telephone in uncompressed digital synthesized form, distributing them automatically to dedicated receiving hosts, or semiautomatically by manually prompting individual voicemail systems before each individual message. In a further aspect of wireless transmission, a microphone/voicenote μPDA as in FIG. 10 may send previously stored voicenotes after docking in a cellular telephone interface.

In Europe and Asia a phone system is in use known as CT2, operating on a digital standard and comprising local substations where a party with a compatible cellular phone may access the station simply by being within the active area of the substation. In one aspect of the present invention, a CT2 telephone is provided with a docking bay for a μPDA, and configured to work with the μPDA. In yet another aspect of the invention, in the CT2 telephone system, and applicable to other digital telephone systems, a compression utility as disclosed above is provided to digitally compress messages before transmission on the CT2 telephone system.

It is roughly estimated that a dedicated compression algorithm may compress ten minutes of voice messages into one minute using the existing CT2 technology. This would save on telephone use charges significantly. In this aspect, there needs be a compatible decompression facility at the receiving station, preferably incorporated into a standard μPDA voicemail system for CT2 or other digital transmissions.

In a further embodiment, control routines are provided to enable the microphone/voicenote μPDA as illustrated in FIG. 10 to carry digital voicenotes, either compressed or uncompressed. When docked in a CT2-compatible μPDA cellular telephone, the μPDA in this embodiment can transmit the digital voicenotes in compressed form.

Figure 12:
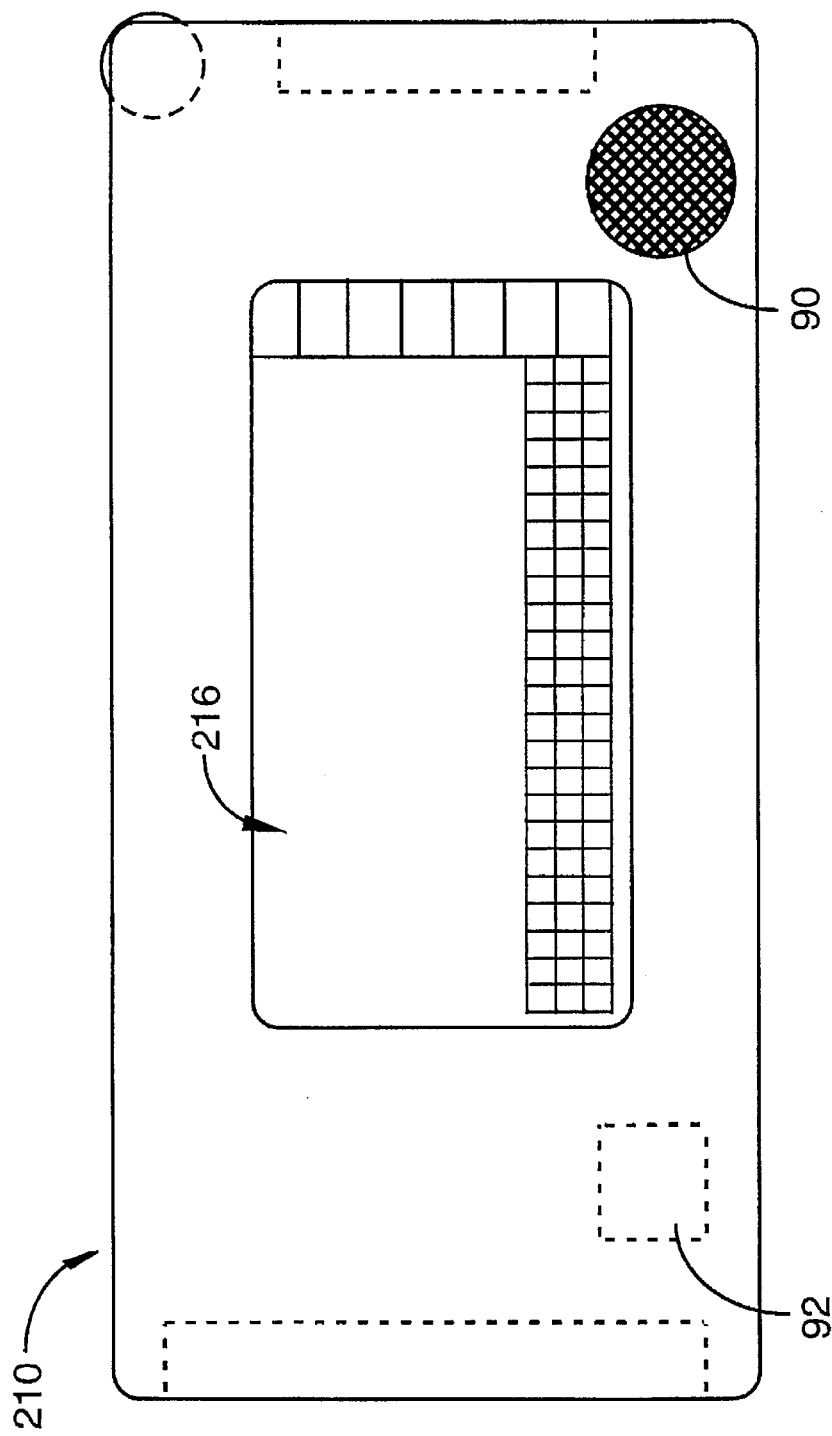
FIG. 12 is a plan view of a μPDA with a speaker and pager interface according to an embodiment of the present invention.

Speaker/Pager:

FIG. 12 is a plan view of a μPDA 210 with a microphone/speaker area 90 and a pager interface 92 according to an embodiment of the present invention. This μPDA has the ability to act as a standard pager, picking up pager signals with installed pager interface 92 and alerting a user through microphone/speaker 90. Once the signals are received, μPDA 210 can be docked in a compatible cellular telephone as illustrated in FIG. 11 and the μPDA will automatically dial the caller's telephone number. All other aspects are as described in the docked mode in the cellular telephone.

In another embodiment, the speaker/pager μPDA can be prompted to generate DTMF tones. The DTMF tones are generated from a caller's telephone number.

The speaker/pager μPDA can store pager requests in its onboard memory. It can also display all pager requests including time and date stamps, identification of the caller, if known, and other related information, on I/O interface 216. In this particular embodiment, a user can receive a page, respond immediately in digital voicenotes on the μPDA via speaker/microphone 90, and then send the response from a dedicated μPDA-compatible cellular telephone or conventional telephone.

Figure 13:
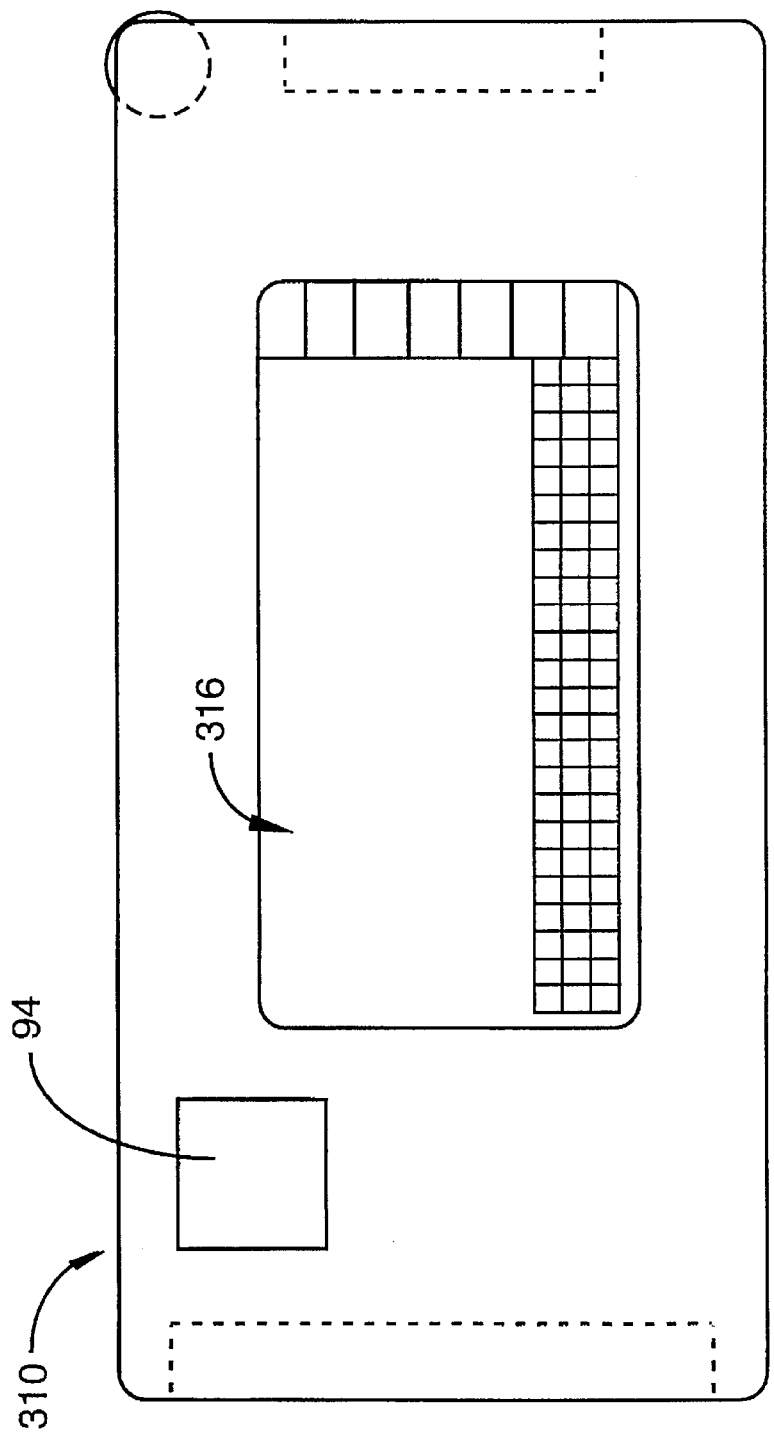
FIG. 13 is a plan view of a μPDA with an infrared communication interface according to an embodiment of the present invention.

Wireless Infrared Interface:

FIG. 13 is a plan view of a μPDA 310 with an IR interface 94 according to an embodiment of the present invention. In this embodiment the μPDA may communicate with an array of conventional appliances in the home or office for providing remote control. Unique signals for the appliances are programmed into the μPDA in a learning/receive mode, and filed with user password protection. Once a correct password in entered, an icon-based menu is displayed on I/O area 316 in a user-friendly format. A master routine first queries a user for which device to access. For example, in a residential application, icons are displayed for such things as overhead garage doors, security systems, automatic gates, VCRs, television, and stereos.

In another aspect of the invention, a receiving station such as a host computer or peripheral interface has IR capabilities to communicate data directly from a nearby μPDA with an infrared interface. In a further embodiment the μPDA may interface in a cellular network and act as a wireless modem.

PERIPHERALS

A μPDA may serve as the platform for various peripheral attachments via expansion port 20 (FIG. 1B and others). Upon attachment to a peripheral, a dedicated pin or pins within expansion port 20 signal microcontroller 11, and a peripheral boot-strap application is executed. Interfacing control routines, which may reside in the peripheral or in the memory of the μPDA, are then executed, and the μPDA I/O interface displays the related menu-driven options after the linking is complete.

Figure 14:
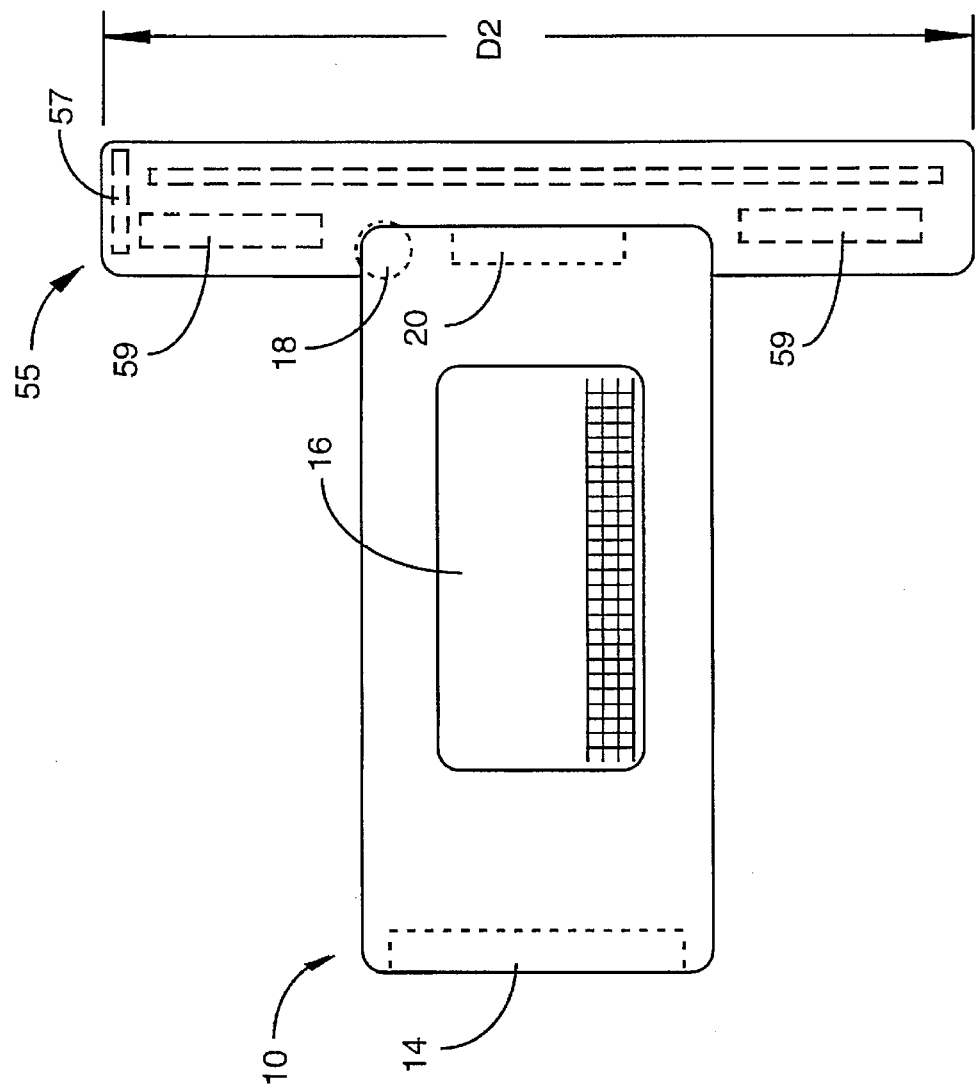
FIG. 14 is a plan view of a μPDA with a scanner attachment according to an embodiment of the present invention.

Scanner:

FIG. 14 is a plan view of a μPDA 10 with a scanner attachment 55 according to an embodiment of the present invention. The scanner attachment is assembled to the μPDA, making electrical connection via expansion port 20. In this embodiment the physical interface of the scanner is shaped to securely attach to the μPDA. Scanner attachment 55 has a roller wheel 57 or other translation sensor, which interfaces with wheel 18 of the μPDA, providing translation sensing in operation for the resulting hand-held scanner. In another aspect, scanner attachment 55 has a translation device which transmits the proper signal through expansion port 20. The scanner bar is on the underside, and one or more batteries 59 are provided within the scanner attachment to provide the extra power needed for light generation.

In the scanner aspect of the invention, scanner attachments 55 of different width D2 may be provided for different purposes. The bar may be no wider than the μPDA, or may be eight inches or more in width to scan the full width of U.S. letter size documents, or documents on international A4 paper. Unique control routines display operating information on the μPDA's I/O area 16 for scanning, providing a user interface for setup of various options, such as the width of the scanner bar, and providing identification for files created in the μPDA memory as a result of scan passes. Scanned data stored in the μPDA memory may be quickly transferred to the host via host interface 14 when the μPDA is docked. Unique routines may be provided to automate the process, so the user does not have to search for files and initiate all of the transfer processes.

Figure 15:
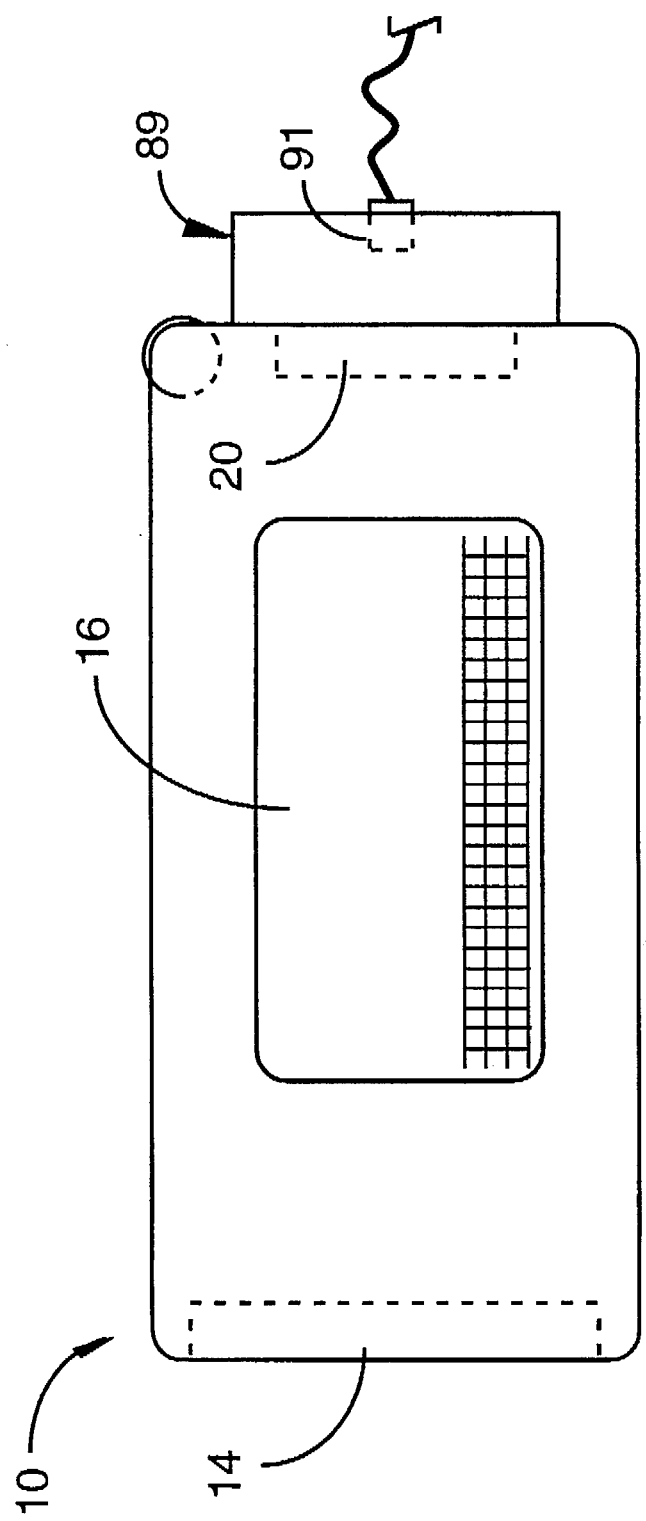
FIG. 15 is a plan view of a μPDA with a fax-modem attached according to an embodiment of the present invention.

Facsimile Option:

FIG. 15 is a plan view of a μPDA with a fax-modem module 89 attached according to an embodiment of the present invention. A fax and telecommunication capability is provided via conventional telephone lines to the μPDA by fax-modem 89 interfacing to expansion bus interface 20. The fax-modem has internal circuitry for translating from the bus states of the expansion bus to the fax protocol, and a phone plug interface 91. In another aspect, the μPDA can be docked in a host and be used in combination with fax-modem 89 to provide faxing and file transfers of both host and μPDA data files. In this case, the fax-modem routines are displayed on the host monitor.

Figure 16:
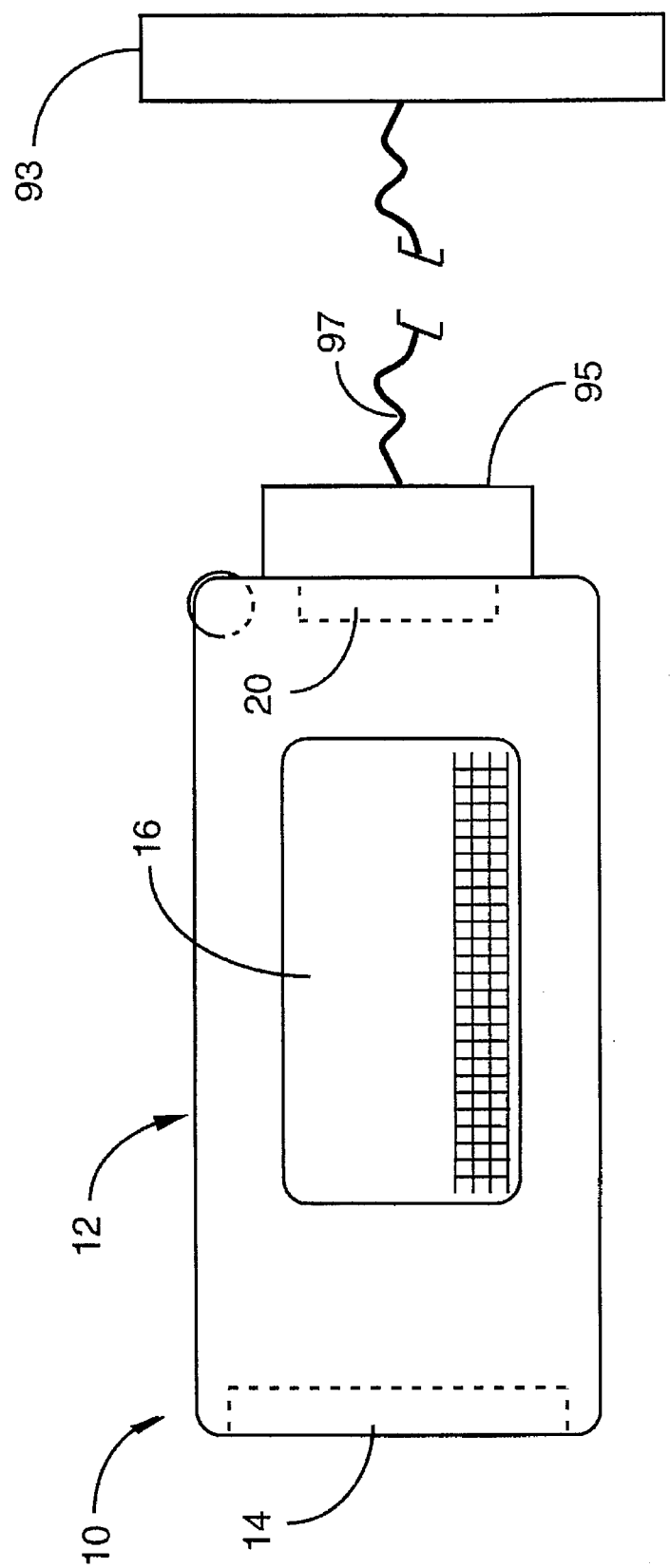
FIG. 16 is a plan view of a μPDA with a printer adapter interface according to an embodiment of the present invention.

Printer:

FIG. 16 is a plan view of a μPDA with a Centronics adapter interface according to an embodiment of the present invention. A printer connector 93 engages expansion interface 20 by a connector 95 through a cable 97. Translation capability resides in circuitry in connector 93, which is configured physically as a Centronics connector to engage a standard port on a printer.

Figure 17:
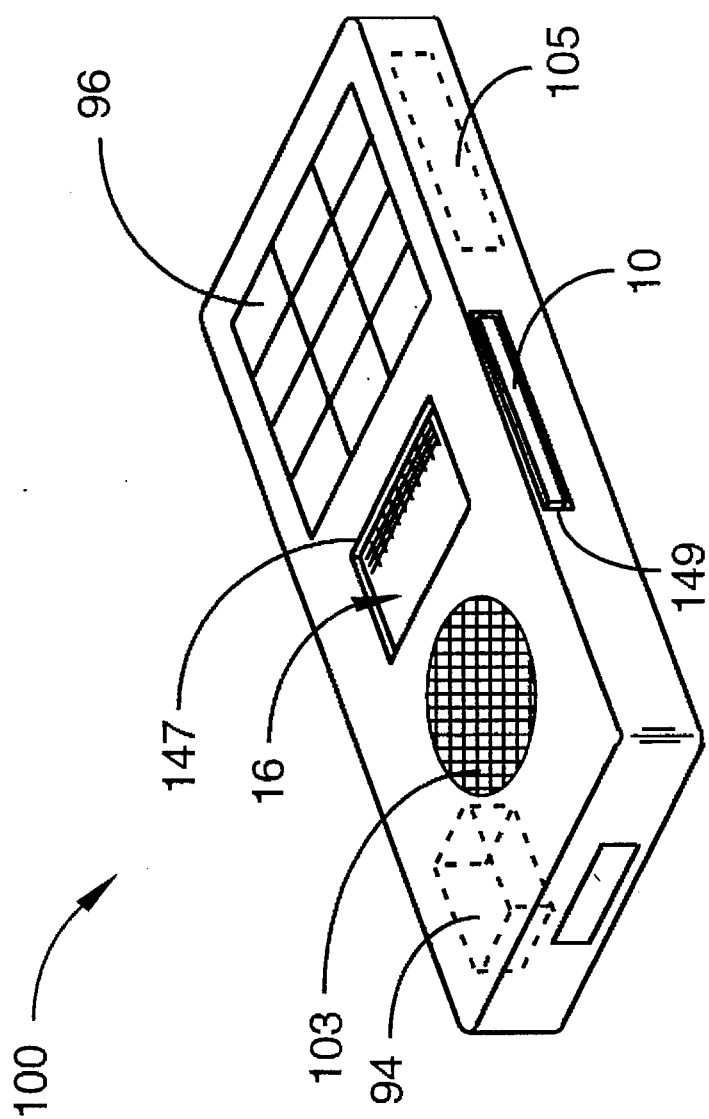
FIG. 17 is an isometric drawing of a μPDA docked in a barcode reader providing a data acquisition peripheral according to an embodiment of the present invention.

Barcode Reader and Data Acquisition Peripheral:

FIG. 17 is an isometric view of a μPDA 10 docked in a barcode reader and acquisition peripheral 100 according to an embodiment of the present invention. μPDA 10 is docked in docking bay 149. I/O interface 16 displays information through opening 147 according to specialized data acquisition applications. In this particular embodiment peripheral 100 has an IR interface 94, a microphone 103, a scanner port 101 (not shown), battery pack 105, and a numeric keypad pad 96 implemented as a touch-sensitive array.

Application routines enable the data acquisition peripheral to operate as, for example, a mobile inventory management device. The user may scan barcode labels with scanner 101 and enter information, such as counts, on keypad 96 or by voice input via microphone 103. Since applications of peripheral 100 are very specialized, only a limited voice recognition system is needed. The voice recognition system may prompt other command routines within the master applications as well.

As inventories are collected, the database may be displayed and also manipulated directly via I/O area 16 in open bay 147, or information may be downloaded at a prompt to a nearby host via IR interface 94.

Alternatively to frequent data transmission, data may be stored or an auxiliary option memory location in peripheral 100.

In another aspect, the data acquisition peripheral may be interfaced to the analog output of a monitoring device, such as a strip chart recorder, and may digitize and store the incoming analog signals.

Figure 18:
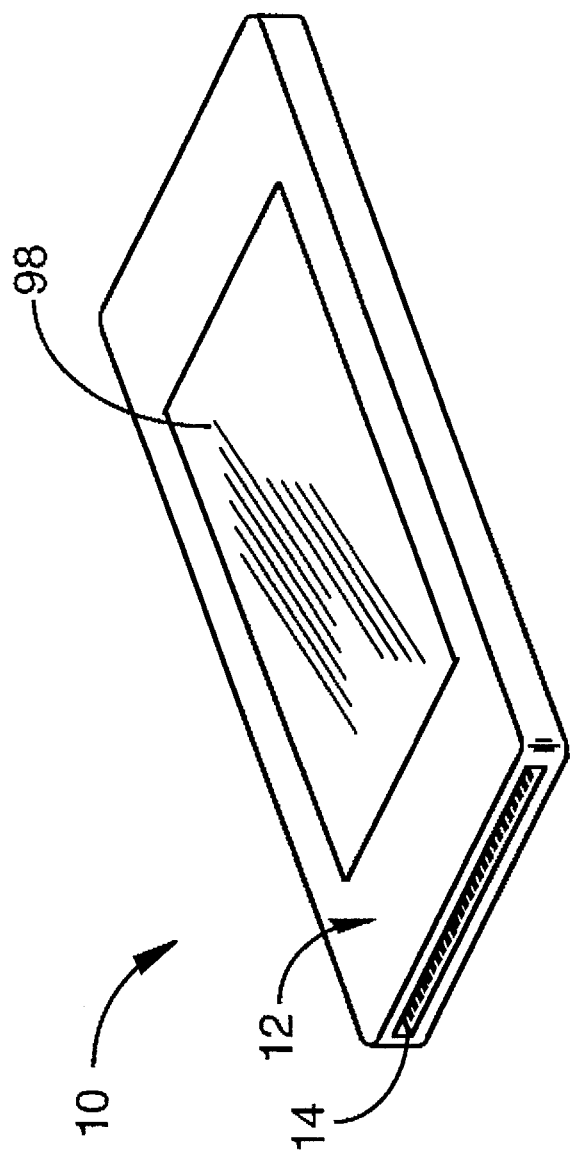
FIG. 18 is an isometric view of a μPDA with a solar charger according to an embodiment of the present invention.

Solar Charger:

FIG. 18 is an isometric view of the side of a μPDA 10 opposite the I/O interface with a solar charger panel 98 according to an embodiment of the present invention. Panel 98 is positioned so that when μPDA 10 is in strong light, such as sunlight, the solar charger absorbs the solar energy and converts it to electricity to recharger battery 15 inside the μPDA. Solar charger 98 may be permanently wired to the circuitry of the μPDA or attached by other means and connected to a dedicated electrical port or the expansion port. The solar charger is placed so that the μPDA can be fully docked in a docking port with the panel in place. In another aspect, a detachable solar charger may be unplugged before docking the μPDA, and the detachable charger may then be of a larger surface area.

Figure 19:
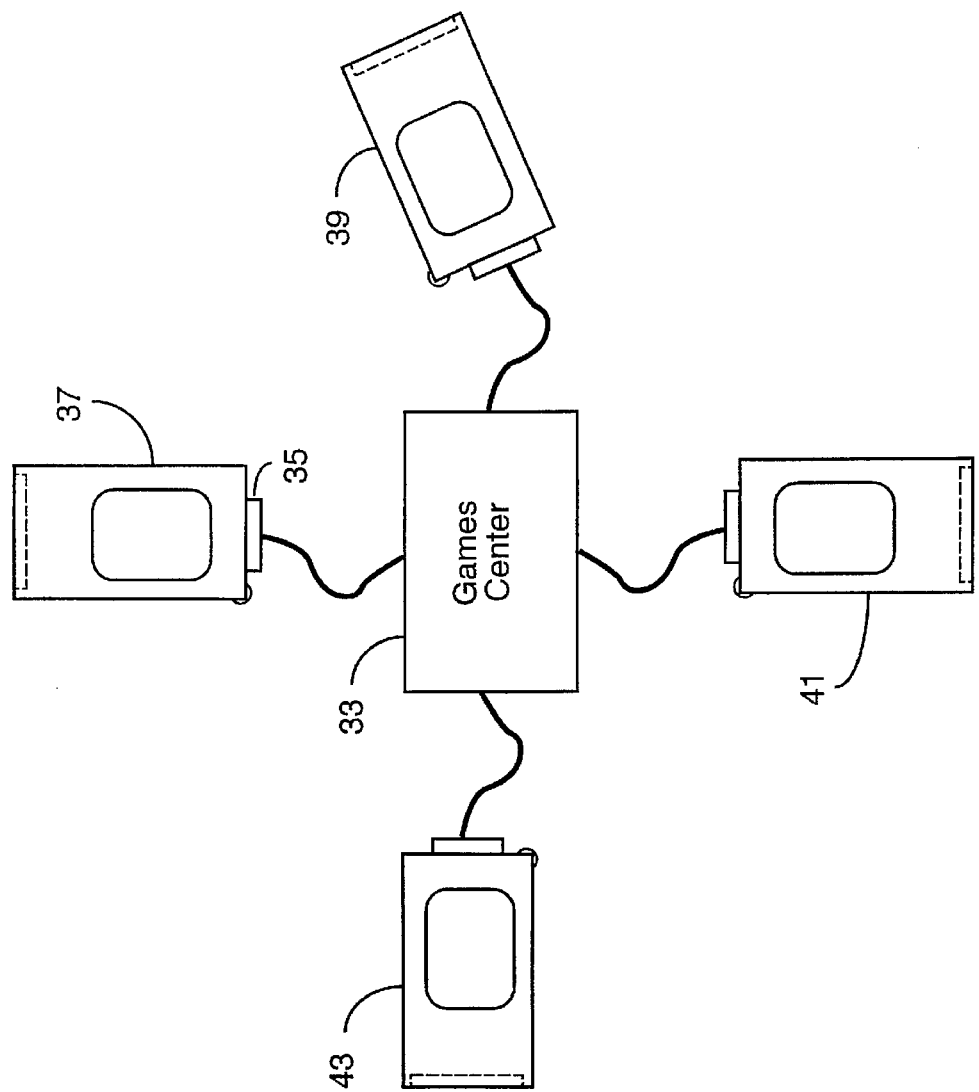
FIG. 19 is a plan view of four μPDAs interfaced to a dedicated network console providing inter-PDA communication according to an embodiment of the present invention.

Games/Conference Center:

FIG. 19 is a largely diagrammatic representation of a Games Center unit 33 according to an aspect of the invention for connecting several μPDA units (37, 39, 41, and 43) together to allow competitive and interactive games by more than one μPDA user. Games Center unit 33 is controlled by an 80486 CPU in this particular embodiment. μPDAs may be connected to the central unit by cable connection via the expansion bus or the host interface of each μPDA, through a connector such as connector 35. The drawing shows four connectors, but there could be as few as two, and any convenient number greater than two.

As a further aspect of the present invention, the gaming center may serve as a conference center where a number of μPDAs may exchange information. In this way, for example through custom routines stored and executable in central unit 33, a manager may update a number of salespeoples' μPDAs, including but not limited to merchandise databases, spreadsheets, price sheets, work assignments, customer profiles, address books, telephone books, travel itineraries, and other related business information while in conference.

Figure 20:
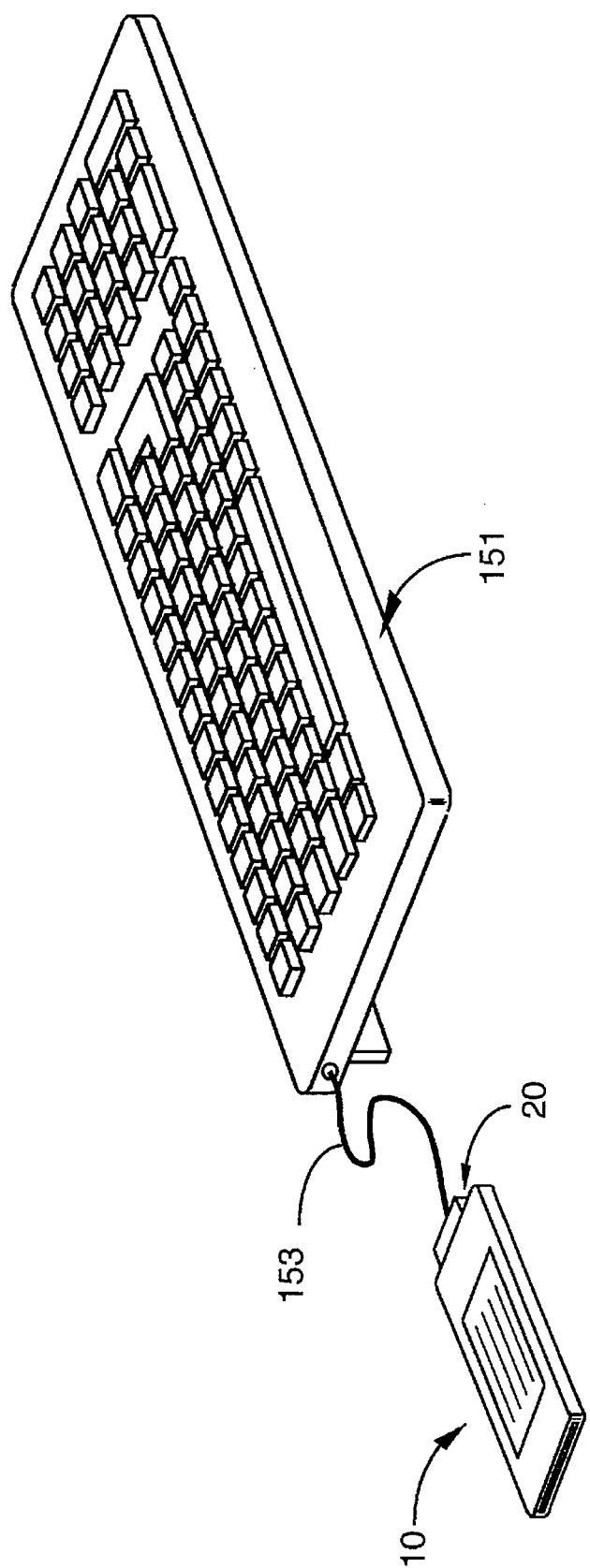
FIG. 20 is an isometric view of a μPDA according to the invention connected by the expansion port to a standard-sized keyboard.

Standard Keyboard:

FIG. 20 is an isometric view of a keyboard 151 connected by a cord and connector 153 to a μPDA 10 via the expansion port 20. In this example, the keyboard is a mechanical keyboard having a full-size standard key array and an on-board controller and interface for communicating with the μPDA. In other embodiments the keyboard may take many other forms, including a two-layer, flexible, roll-up keyboard as taught in U.S. Pat. No. 5,220,521.

In addition to keyboards, other input devices, such as writing tablets and the like may also be interfaced to a μPDA via expansion port 20.

There are numerous additional ways to combine different embodiments of the μPDA for useful functions. For example, an IR-equipped μPDA attached to scanner 55 may transfer large graphic files in embodiments of the μPDA for useful functions. For example, an IR-equipped μPDA attached to scanner 55 may transfer large graphic files in near real time to a host computer. If the files were of text, the host may further process the files automatically through an optical character recognition (OCR) application and send the greatly reduced ASCI files back to the μPDA. As discussed above, the μPDA family of devices establishes a protocol of software security and distribution as well as having the ability to be bus mastered by a host computer system for numerous applications.

Low-Profile Construction Technique:

As pointed out in the Background section, one of the important aspects of the invention, is an ability to provide all of the functional elements for a μPDA according to the invention within a low-profile and relatively small package in a manner to minimize manufacturing cost. Disclosure below, directed primarily toward volmetric efficiency in providing memory capacity, but also useful for achieving volumetric efficiency with all sorts of IC assembly, provides details of a construction technique known to the inventors that may be incorporated to accomplish the ends of low-profile and minimum cost construction.

The development of microelectronics packaging parallels the advancements in circuit integration of ICs. In the computer field, smaller and more powerful units such as notebook and sub-notebook computers are in increasing demand.

The packaging hierarchy within a small computer has a powerful influence on the limits of its performance. One of the most important criteria of performance is having sufficient memory to run state-of-the-art multiple software applications.

In one embodiment, the present invention provides about a 50% increase in usable volumetric "real estate". The Space Saving Memory Module in this embodiment is a hybrid PCB using both rigid and flexible construction materials.

FIG. 21A shows a conventional hardware layout in a microcomputer. Here, multiple PCB boards or cards 1039 are positioned in rows of receptacles that closely stack the individual PCBs. The PCB card in this case is a second level module in packaging hierarchy. Surface mounting technology of DRAM modules such as module 1019 shown, and other discrete components is a third level.

FIG. 21B shows a typicaledge connection scheme for PCBs, with board 1039 held in a recepticle 1041.

FIG. 21C shows a typical manufactured DRAM packaged module 1019, and is of a type known in the art as a Very Small Outline Package (VSOP). The leads are a gull-wing design (see also FIG. 21D) and meet critical design criteria in strength, thermal properties and electrical properties. The I/O connections of the packages is standardized and the structural mounting is partly dependant on the I/O placement.

Memory modules such as DRAMs are conventionally mounted in the manner shown in FIGS. 21A–21D in a designated area on the back plane or motherboard, usually as close as possible to the CPU to keep transfer times to a minimum. The relative practical clearances between DRAM boards dictate the usable real estate on the motherboard. The perpendicular placement of DRAM module PCBs as in FIG. 21A is one example of mounting technology and many other packaging arrangements are possible.

FIG. 22 is a cross-section of a conventional multi-layer printed circuit board, showing packaged module 1019, a plated through-hole 1067, which provides contact between layers, and multiple conductive layers 1065A, 1063A, 1063B, and 1065B, between and upon surfaces of rigid substrates 1060, 1061, and 1062.

Figure 23A:
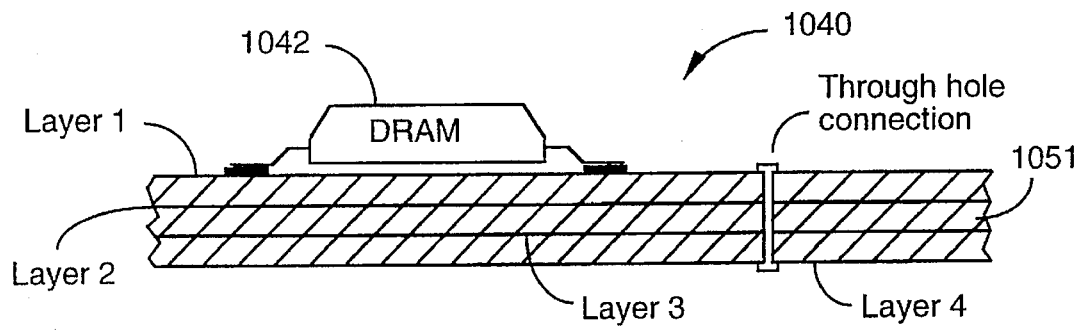
FIG. 23A is an idealized cross-sectional view of a conventional single-sided DRAM memory module.
Figure 23B:
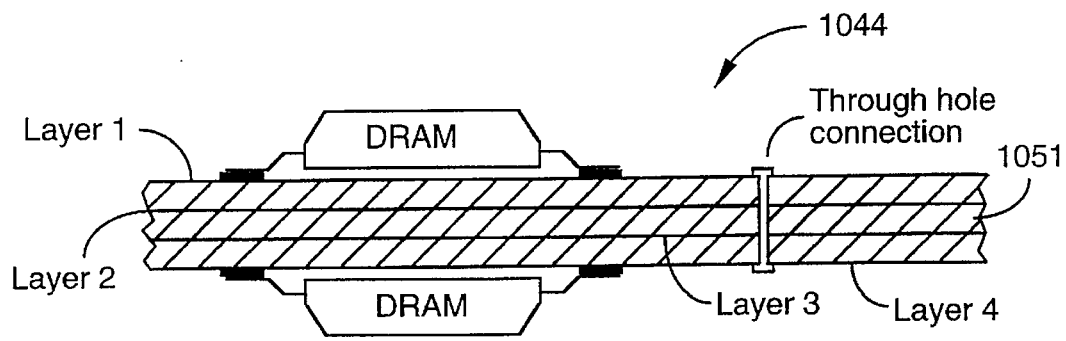
FIG. 23B is an idealized cross-sectional view of a conventional double-sided DRAM memory module.

FIG. 23A is a cross sectional view of a one-sided four layer module, and FIG. 23B is a cross sectional view of a double-sided memory module. Both of these memory modules use surface mounting technology on a four-layered MLB.

A commonly used, cost effective, and durable substrate used in MLBs is FR4. FR4 is an epoxy-resin-glass fiber material. Such laminates are economical and lend themselves rather easily to processing into multilayer boards by heat and pressure. In addition, they can be readily drilled without major problems associated with smearing interconnected circuit traces, and they hold up well to heat and solvents.

The thickness of a multi-level board is typically set by industry standard, and the materials and construction must also conform to established engineering requirements for such characteristics as thermal expansion, dielectric constant, and strength. These standards are known in the art.

A double-sided memory module 1044 (FIG. 23B) assumes about 50% more volume than a single-sided module 1040 (FIG. 23A). This represents the current technology. In these single and double-sided boards Layers 1 and 4 are typically patterned for the circuit signals for the surface mounted DRAM ICs. Layers 2 and 3 are typically patterned for circuitry for the power and ground voltage levels connected by vias such as plated through holes to the active circuitry. An insulating substrate 1051 separates power signals.

Figure 24:
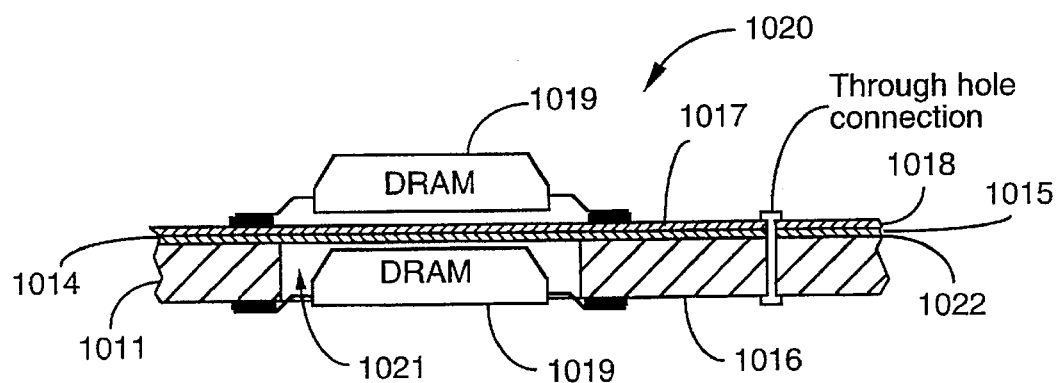
FIG. 24 is a cross-sectional illustration of a multi-layered PCB according to an embodiment of the present invention.

FIG. 24 is a cross sectional view of a PCB 1020 that is an embodiment of the present invention. There are two DRAM modules 1019 shown mounted on PCB assembly 1020. DRAM modules 1019 in this embodiment are surface mounted gull-winged-lead DRAMs. SMT circuitry 1017 is patterned on a layer 1018 of Kapton film. Film 1018 is a flexible material, and Kapton film is a registered trademark of E. I. Dupont.

The thin-film technology deposits coats of conductors or insulators by methods of sputtering, CVD or evaporation at low enough temperatures to avoid flow of the base material. In the embodiment of FIG. 24 circuitry layer 1017 is deposited and patterned, along with SMT pads, on one side of flexible layer 1018, and circuity is also deposited and patterned on the side opposite circuitry layer 1017. This opposite layer is layer 1014 in FIG. 24. Circuitry layer 1014 may be used for ground connections or for power connections, as before described for four-layer boards.

Two more layers of circuitry are provided by a rigid FR4-based PCB 1011 with circuitry layers provided on both sides. Layer 1016 has SMT pads in his embodiment, and layer 1022 may be patterned for ground or power connections as previously described. FR4 is an inexpensive fire-resistant easily processible material, and is one example of several suitable materials. In other embodiments other rigid materials may be preferred.

In the embodiment of FIG. 24 DRAMs 1019 are recessed into closely-fitted openings 1021. The DRAM modules are placed to the SMT pads with what would be the "upper" side of the gull-wing leads in contact with the pads, and are soldered in this position with the bulk of each package thus recessed in the openings 1021. The cross section of a gull-winged lead is symmetrical and structural integrity of reverse mounting and soldering of gull-winged lead DRAM packages and other ICs is essentially the same as for conventional mounting.

The rigid substrate 1011 with circuitry on two sides and the flexible substrate 1018 with circuitry on two sides, are adhesively joined to provide a single structure, and are separated in joining by a film of polyamide dielectric 1015 with a thickness of about 15 micrometers. Layer 1015 is an insulative layer to electrically separate the circuit layers 1014 and 1022. Polyamides are employed in many flexible circuits because of their film strength, ability to withstand 350 degrees Celsius for brief periods, high dielectric strength, and good resistance to a broad range of organic solvents. Other materials may be preferred in different embodiments of the invention.

The unique structure, with about one-half of the supported DRAM component packages recessed in one surface forming a Space Saving Memory Module provides memory capacity about equal to a standard rigid 4-layered, double-sided PCB (FIG. 23B) in about one half the width. This space savings can also be applied to discrete components such as resistors, capacitors, and inductors, each in pre-sized recesses in the double-layered or multilayered PCB in other embodiments of the invention.

Cooling can be improved for the unique board in the described embodiments by PTH connections in separation layer 1015 and/or by air flow-through holes through layers 1015 and 1018 into the openings such as opening 1021. In this embodiment, the air holes provide maximum convection air flow between both the top and bottom DRAM ICs 1019.

There is a thermal advantage in reverse mounting DRAM packages in the recess openings. The internal die, which is the center of concentrated heat generation, is facing outward toward air flow in this mounting, rather than down toward the PCB as in conventional mounting.

Figure 25A:
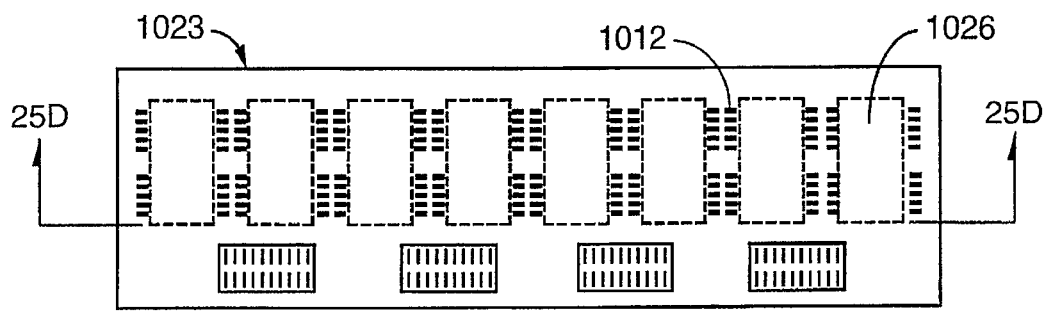
FIG. 25A is a plan view of one side of a memory module card according to an embodiment of the present invention, before adding DRAM ICs.

FIG. 25A is a view of the top side of a memory module board 1023 according to an embodiment of the invention before adding ICs. There are in this embodiment eight positions 1026 for DRAM modules, each surrounded by DRAM IC solder pad locations 1012 on a top layer of conductive Kapton circuitry. The traces of the conductive circuitry are not shown in FIG. 25A.

Figure 25C:
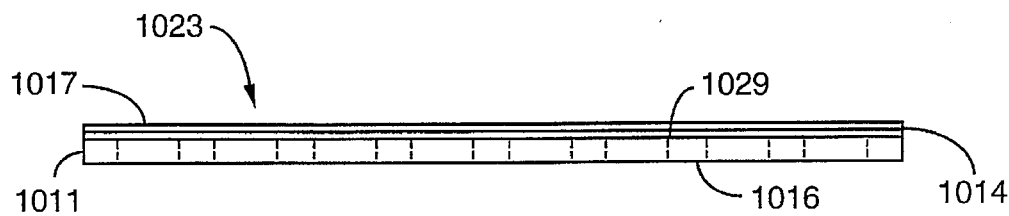
FIG. 25C is an elevation view of the memory module card of FIG. 25A.
Figure 25B:
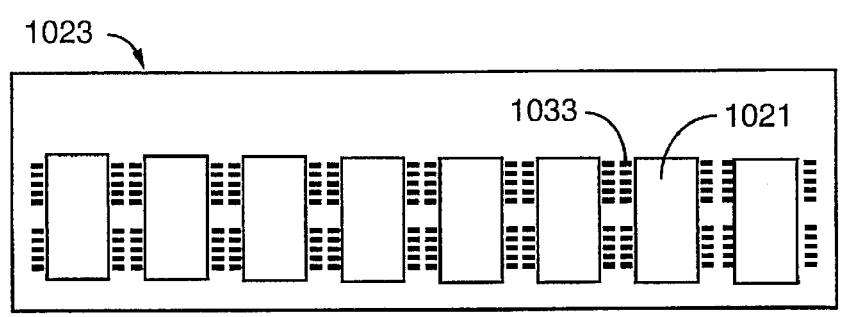
FIG. 25B is a plan view of the opposite side of the memory module card of FIG. 25A.

FIG. 25B is a view of the bottom of module board 1023 before adding ICs. On this side there are eight DRAM IC recess openings 1021 with solder pads 1033 surrounding each opening. In yet another embodiment of the invention these surface mounting pads are also recessed to vary the total width of the Space Saving Module. This feature also eases assembly of the ICs since the leads fall naturally into the right position. Another embodiment comprises a mounting agent with a good coefficient of heat conduction interposed between the top and/or sides of the ICs and adhering to either the rigid PCB board 1011 or to the lamination separator 1015.

FIG. 25C is a side elevation view of the board of FIG. 25A showing two-layer flexible substrate 1018, and rigid FR4 substrate 1011. There are four conductive circuitry traces in the unique PCB assembly in this embodiment: Top layer 1017 on the flexible substrate, ground layer 1014 on the opposite side of the flexible substrate from layer 1014, a power layer 1022 on one surface of FR4 board 1011, and a bottom layer 1016 on the other side of the rigid substrate. Insulating separator 1015 is bonded above to the Kapton flexible substrate and below to the FR4 rigid substrate.

In yet another embodiment of the invention there is more than one stepped level of recessed components in the rigid substrate to accommodate particular packaging and circuit design requirements with any number of layered, laminated PCBs. Another embodiment uses heat sinks either individually or in a combination over recessed ICs. Internal passages are constructed to contain and direct flow of liquid coolants in yet another embodiment of the invention.

Figure 25D:
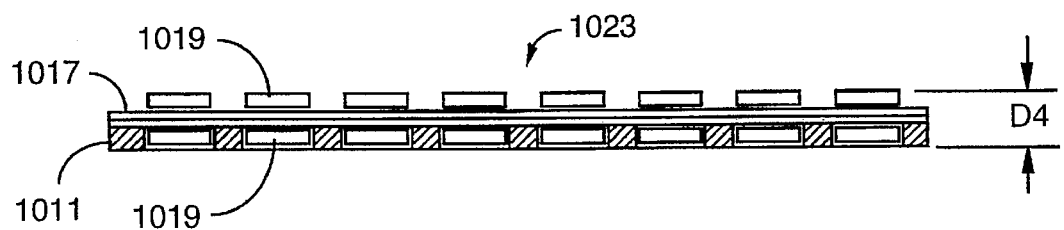
FIG. 25D is an elevation view of an assembled card with DRAMs according to the embodiment of the embodiment of FIGS. 25A, B, and C.

FIG. 25D is an elevation section view along line 25D—25D of FIG. 25A, showing the board of FIG. 25A with DRAMs 1019 mounted to solder pads. The Space Saving Module in this embodiment comprises 16 DRAM IC packages.

One skilled in the art may adapt the Space Saving Module to larger memory configurations including any number of individual DRAMs ICs according to any required design application. Also, the recessed Space Saving Module can incorporate other surface mounting assemblies such as the Square Quad Flat Pac (SQFP), Rectangular Quad Flat Pac (RQFP), Plastic Leaded Chip Carrier (PLCC) and Leadless Ceramic Chip Carriers. Another embodiment might incorporate the use of J-leads and/or buR-leads.

The overall thickness of the Space Saving Memory Module can vary according to different stand-off dimensions (FIG. 21D dimension D3). The choice of stand-off height among several available may be made according to heat transfer requirements and substrate thickness 1011. Other factors that may influence overall board thickness in other embodiments are types and sizes of ICs and discrete components to be used, as well as design requirement of the MLBs.

The thickness D4 of the Space Saving Memory Module (FIG. 25D) is approximately the same as the thickness of a single-sided conventional board as seen in FIG. 23A, affording double the memory capacity in substantially the same volume. This is a very valuable feature, especially for compact computers, such as laptop, notebook, and palmtop models.

An additional advantage of the Space Saving Memory Module according to embodiments of the invention is in the simplicity of the board construction. The two-level board with film having traces on both sides forming the third and fourth layers is less costly to construct than a conventional four-layer PCB.

There are a number of ways components may be recessed below the surface of a multilayered PCB to accommodate engineering considerations such as thermal properties, protection from handling, ease of assembly, and general structural integration. For example, recessed components may be incorporated directly in the substrate as a coating or in the process of individual packaging.

It will be apparent to one with the skill in the art that there are many changes that might be made without departing from the spirit and scope of the invention. Some of these alternatives have already been described, such as various design applications involving the recessing of discrete electrical components into MLBs. Reasons for recessed components may include engineering priorities such as, but not limited to, thermal, structural, MLB lamination processing costs, individual packaging and packaging restraints.

The Space Saving Memory Module can be incorporated with injection molding technology in another embodiment of the invention. The recess openings for components in this case may be molded into the injection-molded board to accommodate any ICs or discrete components. Also, new lead designs may be developed in SMT specifically to take advantage of the Space Saving Module invention as disclosed in several embodiments herein, or other embodiments within the spirit and scope of the invention. Advancements in flexible thin-film technologies may incorporate the Space Saving Module format by "wrapping" multilayer flex MLBs around alternately spaced recessed modules where the ICs are stress bonded to form the rigid plane of the board. Superconductor technology may incorporate recessed ICs as containers and/or structural elements. There are many other deviations that fall within the spirit and scope of the invention.

Further advancement in VLSI of ICs produces a greater number of I/O connections. Chip and the package technologies are interdependent. The nature of the ICs that are actually used will depend on the package design's complexity and refinements. The invention introduces a level of packaging hierarchy that will keep pace with the rapid developments in microelectronics miniaturization.

It will be apparent to one with the skill in the art that there are many changes that might be made and many other combinations that might be made without departing from the spirit and scope of the invention. There are, for example, many ways to implement the support structure of the μPDA, and to interconnect the active components. One way has been illustrated by FIG. 2 and described in accompanying text. There are many alternatives to this preferred structure. There is also a broad range of sizes and form factors that might be assumed by devices according to the present invention. The use of well-known PCMCIA form factors has been disclosed, but other sizes and forms might also be provided in alternative embodiments. In larger embodiments, on-board peripherals may be implemented.

In addition to these alternatives, there are various ways the connectivity of a μPDA bus might be provided. The well-known PCMCIA standard has been disclosed as a preference, but other connectivity may also be used in alternative embodiments. Memory types and sizes may vary. Means of providing a security code may vary. The nature of the internal bus may vary. There are indeed many variations that do not depart from the spirit and scope of the invention.

What is claimed is:

1. A digital assistant module, comprising:
   an enclosure for enclosing and supporting internal elements;
   a plurality of integrated circuit (IC) chips within the enclosure, including a CPU chip, interconnected by electrically conductive traces, the IC chips for performing management, calculation, display, and storage functions for the digital assistant module;
   a substantially rigid substrate within the enclosure forming a support structure for the IC chips mounted wholly within cavities opening to one or both opposite parallel surfaces of the substantially rigid substrate, providing thereby a low-profile assembly; and
   a touchscreen combination display and input device implemented on a surface of the enclosure.

2. A digital assistant module as in claim 1 wherein the electrically conductive traces between the IC chips are implemented on surfaces of the substantially rigid substrate.

3. A digital assistant module as in claim 1 further comprising at least one flexible-film substrate overlying the substantially rigid substrate, wherein further electrically conductive traces are provided on the at least one flexible-film substrate for interconnecting the IC chips.

4. A digital assistant module as in claim 1 further comprising a host interface having a host interface bus coupled to the CPU and to a first portion of a host interface connector at a surface of the enclosure, the host interface bus providing address lines, data lines, and control signal lines for use by the CPU in communicating with a host computer, control signals on the control signal lines including read/write and at least one memory control signal.

5. A digital assistant module as in claim 1 additionally comprising a storage power supply within the enclosure for supplying electrical power to power-using elements of the digital assistant module.

6. A digital assistant module as in claim 5 further comprising a solar energy conversion panel having electrical connections for attaching to and recharging the storage power supply.

7. A digital assistant module as in claim 1 additionally comprising an expansion bus interface comprising an expansion bus coupled to the CPU and to a first portion of an expansion bus connector implemented on a surface of the enclosure, the expansion bus interface for connecting the digital assistant module to input/output (I/O) devices.

8. A digital assistant module as in claim 1 additionally comprising a nonvolatile storage device connected to the CPU and containing a code unique to the digital assistant module, for uniquely identifying the digital assistant module to a connected host.

9. A digital assistant module as in claim 1 wherein the touchscreen combination display and input device comprises an LCD display.

10. A digital assistant module as in claim 1 further comprising a pointer device for providing positional and directional input for control operations performed in conjunction with the combination display and input device.

11. A digital assistant module as in claim 10 wherein the pointer device comprises a thumbwheel implemented at one corner of the enclosure.

12. A digital assistant module, comprising:
    an enclosure for enclosing and supporting internal elements;
    a plurality of integrated circuit (IC) chips within the enclosure, including a CPU chip, for performing management, calculation, display, and storage functions for the digital assistant module, the IC chips encapsulated within a polymeric material forming a substantially rigid substrate with bonding pads of the IC chips exposed on a surface of the substrate; and
    one or more flexible-film substrates having conductive traces provided thereon, overlying the substantially rigid substrate, the conductive traces bonded to the bonding pads of the encapsulated IC chips, thereby providing electrical interconnection between the encapsulated IC chips; and
    a touchscreen combination display and input device implemented on a surface of the enclosure.

13. A digital assistant module as in claim 12 further comprising a host interface having a host interface bus coupled to the CPU and to a first portion of a host interface connector at a surface of the enclosure, the host interface bus providing address lines, data lines, and control signal lines, control signals on the control signal lines including read/write and at least one memory control signal.

14. A digital assistant module as in claim 12 additionally comprising a storage power supply within the enclosure for supplying electrical power to power-using elements of the digital assistant module.

15. A digital assistant module as in claim 14 further comprising a solar energy conversion panel having electrical connections for attaching to and recharging the storage power supply.

16. A digital assistant module as in claim 12 additionally comprising an expansion bus interface comprising an expansion bus coupled to the CPU and to a first portion of an expansion bus connector implemented on a surface of the enclosure, the expansion bus interface for connecting the digital assistant to input/output (I/O) devices.

17. A digital assistant module as in claim 12 additionally comprising a nonvolatile storage device connected to the CPU and containing a code unique to the digital assistant module, for uniquely identifying the digital assistant module to a connected host.

18. A digital assistant module as in claim 12 wherein the combination touchscreen display and input device comprises an LCD display.

19. A digital assistant module as in claim 12 further comprising a pointer device for providing positional and directional input for control operations performed in conjunction with the display of the combination touchscreen display and input device.

20. A digital assistant module as in claim 19 wherein the pointer device comprises a thumbwheel implemented at one corner of the enclosure.

* * * * *